US012649179B2

(12) United States Patent
Coll et al.

(10) Patent No.: US 12,649,179 B2
(45) Date of Patent: ***Jun. 9, 2026

(54) METHOD FOR MANUFACTURING A BUNK FOR A VEHICLE

(71) Applicant: AMD Plastics, LLC, New Concord, OH (US)

(72) Inventors: Brian F. Coll, Zanesville, OH (US); Eric M. Wright, Zanesville, OH (US); Jorge L. Aguirre, Saltillo (MX)

(73) Assignee: FABRI-FORM HOLDINGS, LLC, Muskegon, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/240,928

(22) Filed: Jun. 17, 2025

(65) Prior Publication Data

US 2025/0312839 A1     Oct. 9, 2025

Related U.S. Application Data

(63) Continuation of application No. 18/691,888, filed as application No. PCT/US2022/043832 on Sep. 16, 2022, now Pat. No. 12,358,039.

(60) Provisional application No. 63/339,717, filed on May 9, 2022, provisional application No. 63/244,772, filed on Sep. 16, 2021.

(51) Int. Cl.
*B21D 53/88*         (2006.01)
*B62D 33/06*         (2006.01)

(52) U.S. Cl.
CPC .......... *B21D 53/88* (2013.01); *B62D 33/0612* (2013.01)

(58) Field of Classification Search
CPC ........ B29C 44/18; B29C 44/38; B29C 44/588
See application file for complete search history.

(56) References Cited

U.S. PATENT DOCUMENTS 2,802,766 A * 8/1957 Leverenz ................ B32B 27/00
                                                    156/289
4,734,232 A * 3/1988 Hoesman ................ B29C 44/18
                                                    264/46.9

(Continued)

FOREIGN PATENT DOCUMENTS

CN         113183387 A * 7/2021  ............. B29C 44/18

OTHER PUBLICATIONS

CN-113183387-A translation (Year: 2021).*

*Primary Examiner* — Michael W Hotchkiss
(74) *Attorney, Agent, or Firm* — FBT GIBBONS LLP

(57)         ABSTRACT

A method for manufacturing a bunk assembly for a transit vehicle is provided. The method includes forming an upper shell and forming a lower shell. The method further includes installing a frame between the upper shell and the lower shell and joining the upper shell and the lower shell together to form a support panel. The method further includes drilling a fill hole and a vent hole in the lower shell, the vent hole having a first diameter and filling the support panel with foam through the fill hole via the fill hole and such that air contained within the support assembly is vented through the vent hole. The method further includes redrilling the vent hole to a second diameter to form a mount hole, the second diameter being greater than the first diameter and mounting hardware to the support panel at the mounting hole.

20 Claims, 30 Drawing Sheets

(56) References Cited

U.S. PATENT DOCUMENTS

| | | | |
|---|---|---|---|
| 6,668,397 B2 * | 12/2003 | Olenick | B62D 33/06 |
| | | | 5/118 |
| 6,726,865 B2 * | 4/2004 | Mielke | B29C 37/0032 |
| | | | 264/102 |
| 8,015,635 B1 * | 9/2011 | Miga | B62D 33/0612 |
| | | | 5/8 |
| 2003/0003252 A1 * | 1/2003 | Yun | B29C 49/04112 |
| | | | 428/188 |
| 2011/0135862 A1 * | 6/2011 | Sumi | B29C 49/20 |
| | | | 428/137 |
| 2012/0223452 A1 * | 9/2012 | Tailor | F16L 47/22 |
| | | | 264/46.9 |
| 2018/0055233 A1 * | 3/2018 | Frederick | B62D 33/0207 |
| 2018/0112909 A1 * | 4/2018 | Choi | F25D 23/028 |
| 2020/0130240 A1 * | 4/2020 | Costanza | F25D 23/028 |

* cited by examiner

METHOD FOR MANUFACTURING A BUNK FOR A VEHICLE

REFERENCE TO RELATED APPLICATIONS

This application is a continuation of U.S. patent application Ser. No. 18/691,888, entitled Method for Manufacturing a Bunk for a Vehicle, filed Mar. 14, 2024 which is a U.S. National Stage Application under 35 U.S.C. § 371 of International Application No. PCT/US2022/043832, entitled Method for Manufacturing a Bunk for a Vehicle, filed Sep. 16, 2022, which claims priority of U.S. provisional patent application Ser. No. 63/244,772, entitled Method for Manufacturing a Bunk for a Vehicle, filed Sep. 16, 2021 and U.S. provisional patent application Ser. No. 63/339,717, entitled Method for Manufacturing a Bunk for a Vehicle, filed May 9, 2022, and hereby incorporates these patent applications by reference herein in their respective entireties.

TECHNICAL FIELD

A method for manufacturing a bunk for a vehicle is provided. The bunk can be an upper bunk or a lower bunk.

BACKGROUND

Certain transit vehicles, such as tractor trailer rigs, include a sleeper cabin that provides sleeping quarters for a driver. The sleeper cabin includes a bunk that is pivotable between a stowed position and a deployed position. When in the deployed position, the bunk can serve as a bed for a passenger.

BRIEF DESCRIPTION OF THE DRAWINGS

It is believed that certain embodiments will be better understood from the following description taken in conjunction with the accompanying drawings in which.

DETAILED DESCRIPTION

Figure 1:
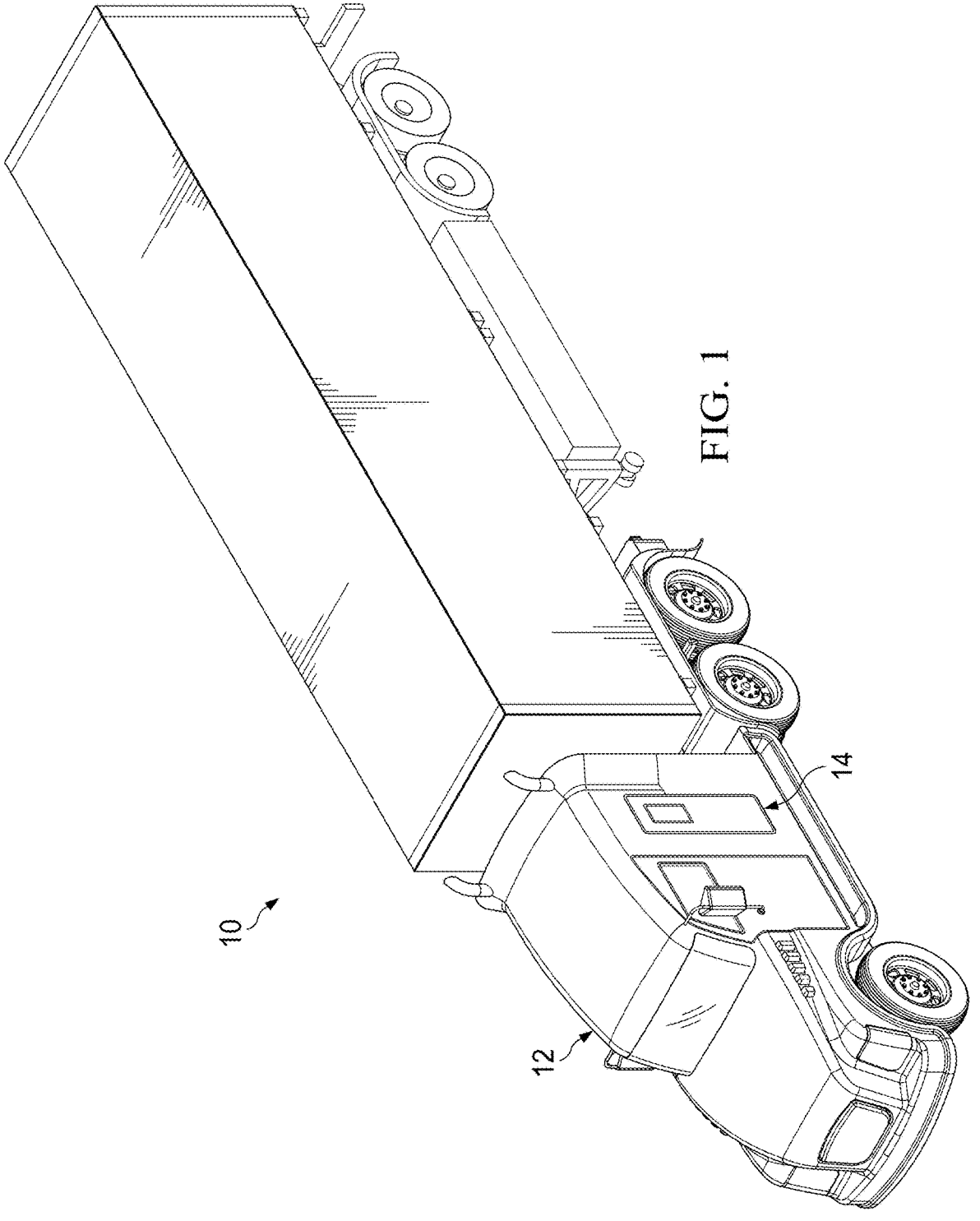
FIG. 1 is an isometric view depicting an on highway truck.

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments. In various embodiments disclosed herein, a single component can be replaced by multiple components and multiple components can be replaced by a single component to perform a given function or functions. Except where such substitution would not be operative, such substitution is within the intended scope of the embodiments.

The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Technical solutions to enhance the manufacturing process for a bunk for a transit vehicle can be achieved by the systems, apparatuses and methods of the present disclosure. In general, the disclosed systems, apparatuses and methods enable a bunk for a transit vehicle to be manufactured more efficiently and cost effectively than conventional bunk manufacturing methods.

The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Figure 2:
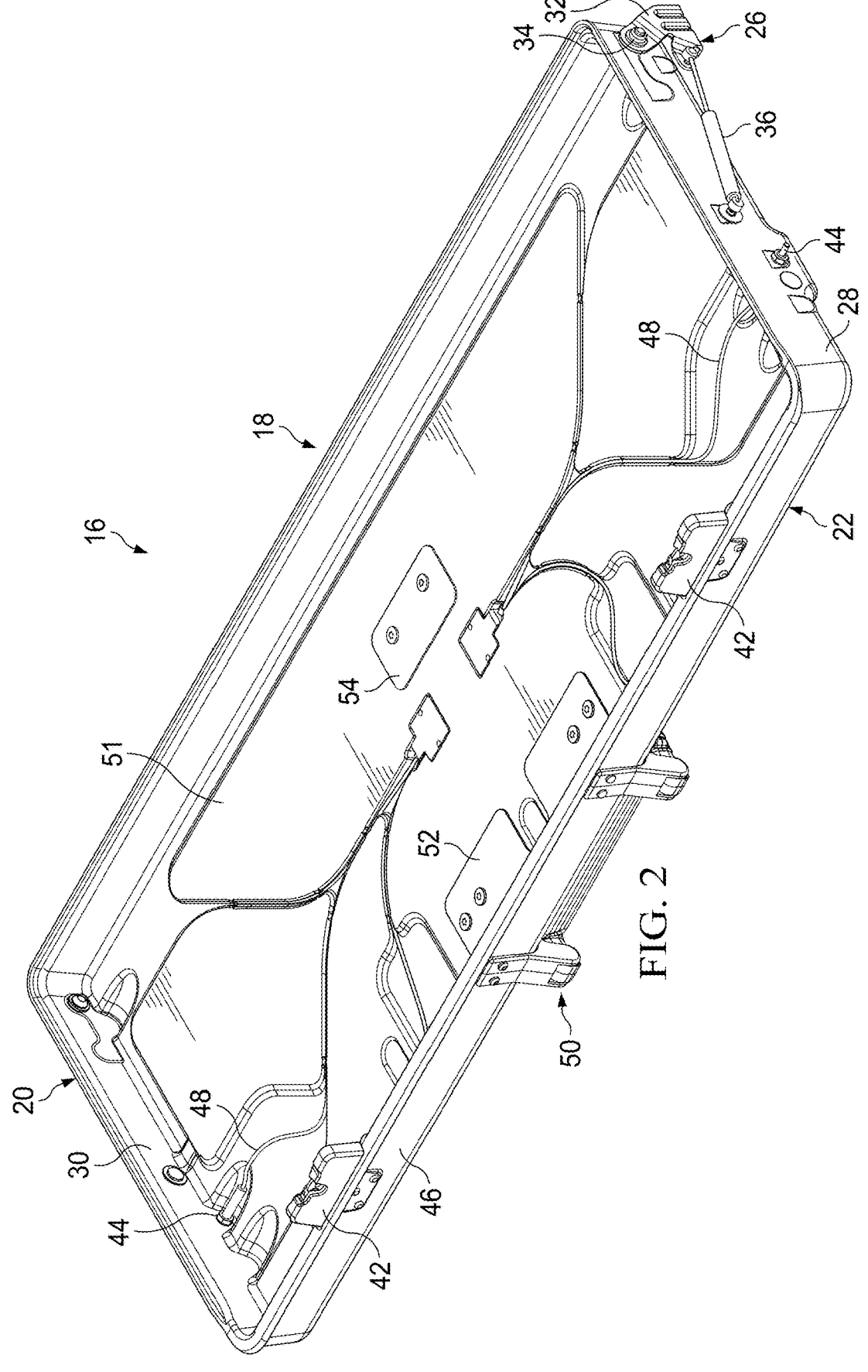
FIG. 2 is an upper isometric view depicting a bunk assembly for the vehicle of FIG. 1, in accordance with one embodiment.
Figure 3:
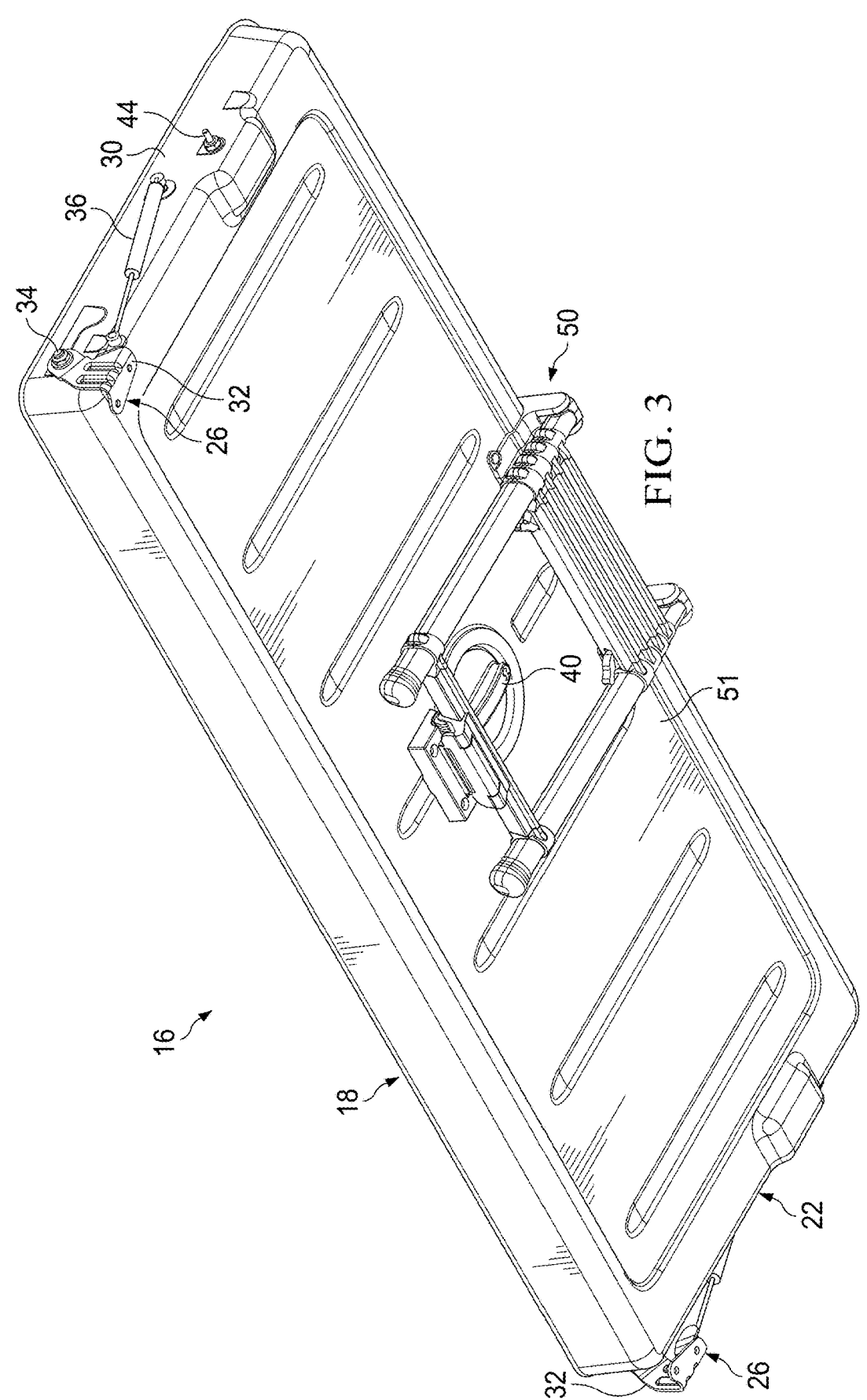
FIG. 3 is a lower isometric view of the bunk assembly of FIG. 2.
Figure 4:
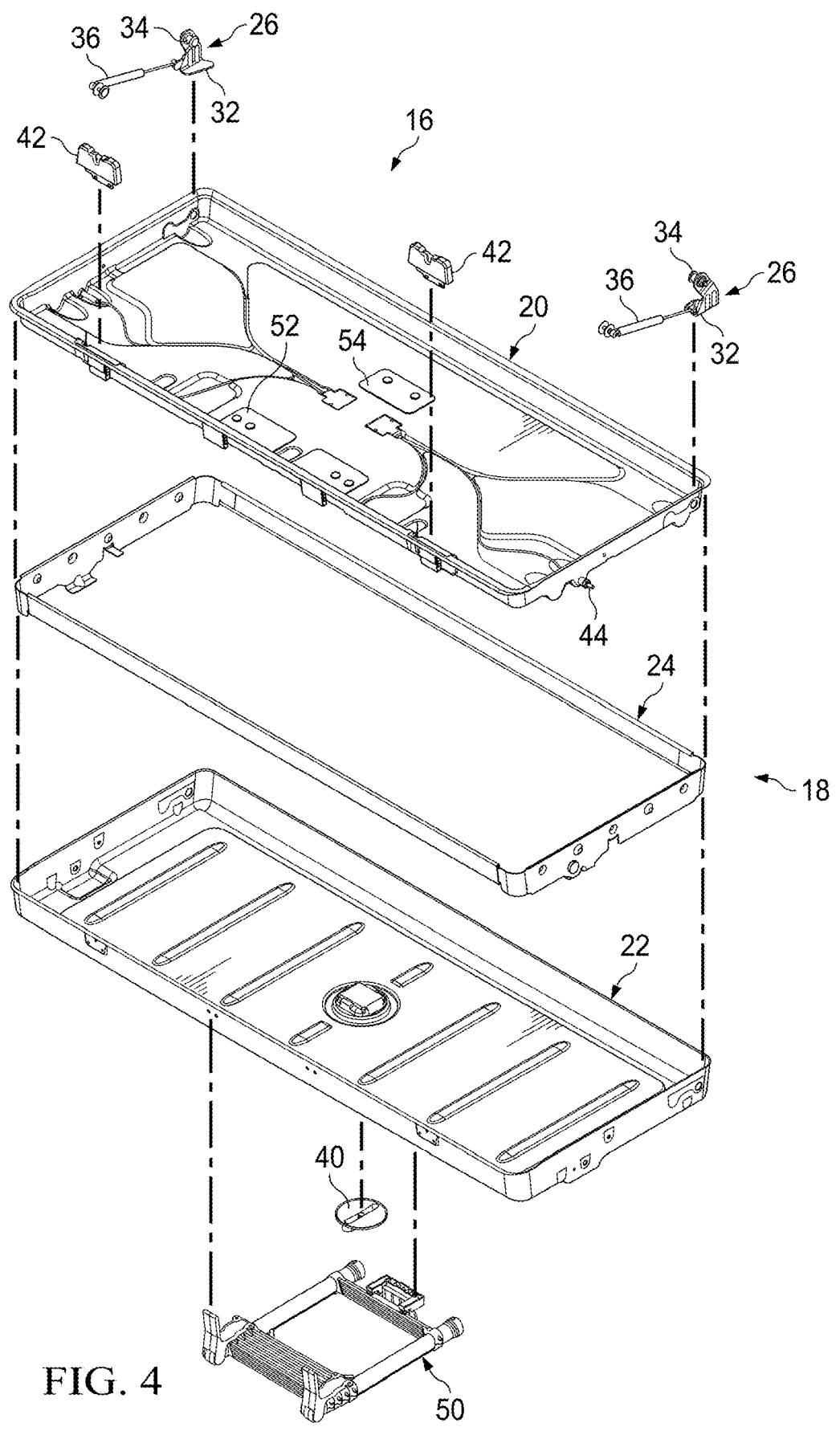
FIG. 4 is an exploded view of the bunk assembly of FIG. 2.

Embodiments are hereinafter described in detail in connection with the views and examples of FIGS. 1-30, wherein like numbers indicate the same or corresponding elements throughout the views. FIG. 1 illustrates an on-highway truck 10 that includes a passenger compartment 12 and a sleeper cabin 14 located behind the passenger compartment 12. It is to be appreciated that although an on-highway truck (i.e., tractor-trailer rig) is shown, any of a variety of suitable transit vehicles are contemplated, such as a van, a locomotive, an airplane, or any of a variety of suitable alternative vehicles that can accommodate a sleeping passenger. FIGS. 2-4 illustrate a bunk assembly 16 that can be pivotally coupled to a rear wall (not shown) of the sleeper cabin 14. The bunk assembly 16 can be pivotable between a stowed position and a deployed position. The bunk assembly 16 can be stored in the stowed position during driving of the on-highway truck 10 and can be pivoted into the deployed position when the on-highway truck is parked to accommodate a sleeping passenger.

Still referring to FIGS. 2-4, the bunk assembly 16 can include a support panel 18 that includes an upper shell 20 (FIGS. 2 and 4), a lower shell 22, and a frame 24 that is sandwiched between the upper shell 20 and the lower shell 22. A pair of hinge assemblies 26 can each be coupled to one of a right wall 28 and a left wall 30 of the support panel 18 to facilitate pivoting of the bunk assembly 16 between the stowed position and the deployed position. Each hinge assembly 26 can include a hinge bracket 32, a pivot pin 34 that extends between the support panel 18 and the hinge bracket 32, and a lift support member 36 that is coupled with each of the support panel 18 and the hinge bracket 32. The lift support members 36 can cooperate to aid in pivoting of the bunk assembly 16 between the stowed position and the deployed position.

As illustrated in FIG. 4, the bunk assembly 16 can include a latching mechanism 38 that facilitates selective latching of the bunk assembly 16 in either the stowed position or the deployed position. The latching mechanism 38 can include a release handle 40, a pair of latches 42, and a pair of shot pins 44. As illustrated in FIG. 2, the pair of latches 42 can be coupled with the support panel 18 along a front wall 46. Each of the shot pins 44 can be disposed at respective ones of the right wall 28 and the left wall 30 of the support panel 18. The release handle 40 can be operably coupled with the latches 42 and the shot pins 44 by respective cables 48 such that the release handle 40 can be rotated between a released state and an actuated state to selectively and simultaneously operate the latches 42 and the shot pins 44. When the release handle 40 is in the released state, each of the latches 42 and the shot pins 44 can be in a latched position to facilitate retention of the bunk assembly 16 in either the stowed position or the deployed position. When the release handle 40 is rotated to the actuated state, each of the latches 42 and the shot pins 44 can be moved to an unlatched position to facilitate releasing of the bunk assembly 16 when it is latched in the stowed position or the deployed position.

As illustrated in FIGS. 3 and 4, the bunk assembly 16 can include a ladder 50 that is mounted to a bottom wall 51 of the support panel 18 with a front plate 52 and a rear plate 54 (FIGS. 2 and 4). The ladder 50 can be selectively pivotable between a stowed position (FIG. 3) and a deployed position (not shown). When the bunk assembly 16 is provided as an upper bunk in a two-bunk configuration, a user can use the ladder 50 to climb onto and off of the bunk assembly 16 when it is in the deployed position.

Figure 5:
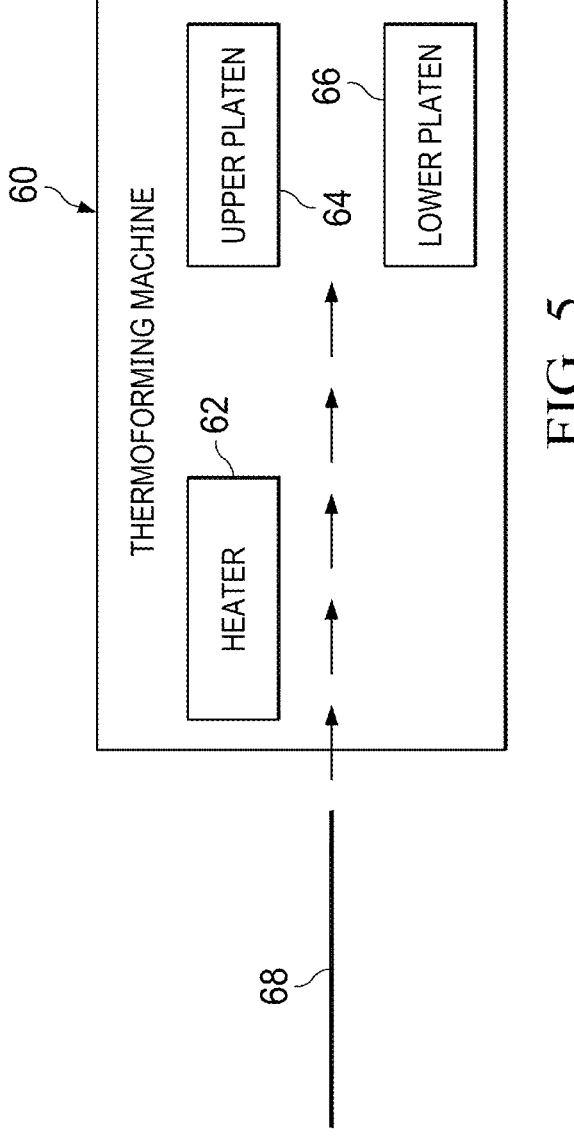
FIG. 5 is a schematic view of a thermoforming machine for thermoforming an upper shell and a lower shell of the bunk assembly of FIG. 2.

One example of a method of manufacturing the bunk assembly 16 will now be described with reference to FIGS. 5-XX. First, each of the upper shell 20 and the lower shell 22 can be formed via a thermoforming process. One example of a thermoforming machine 60 that might be used in such a thermoforming process is illustrated in FIG. 5. The thermoforming machine 60 can include a heater 62, an upper platen 64, and a lower platen 66. The upper platen 64 and the lower platen 66 can have mating forming tools (not shown) disposed thereon that cooperate to either form the upper shell 20 or the lower shell 22. The mating forming tools can be responsible for the overall shape of the upper shell 20 or the lower shell 22 as well as any molded details thereon.

A sheet of raw material 68 (e.g., a sheet of ABS plastic) can be provided in the heater 62 and heated to a desired temperature (e.g., 300 degrees F.). The heat generated by the heater 62 can be controlled by temperature controller units (not shown) or any of a variety of other suitable alternative control arrangements in order to achieve a desired thermoforming temperature. Once the sheet of raw material 68 reaches the desired temperature, it can be moved from the heater 62 and provided between the upper and lower platens 64, 66. The upper and lower platens 64, 66 can then be pressed together thereby sandwiching the sheet of raw material 68 between the mating forming tools provided on the upper and lower platens 64, 66. A vacuum can be applied to the sheet of raw material 68 in order to encourage it to take the shape of the mating forming tools. The upper and lower platens 64, 66 can then be separated from each other and the resulting shell (either the upper shell 20 or the lower shell 22 depending on which mating forming tools were used) can be removed from the thermoforming machine 60. In one embodiment, different thermoforming machines (e.g., 60) can be provided for the upper shell 20 and the lower shell 22 as part of a larger, 2-station, thermoforming machine such that the upper shell 20 and the lower shell 22 can be simultaneously thermoformed.

Figure 6:
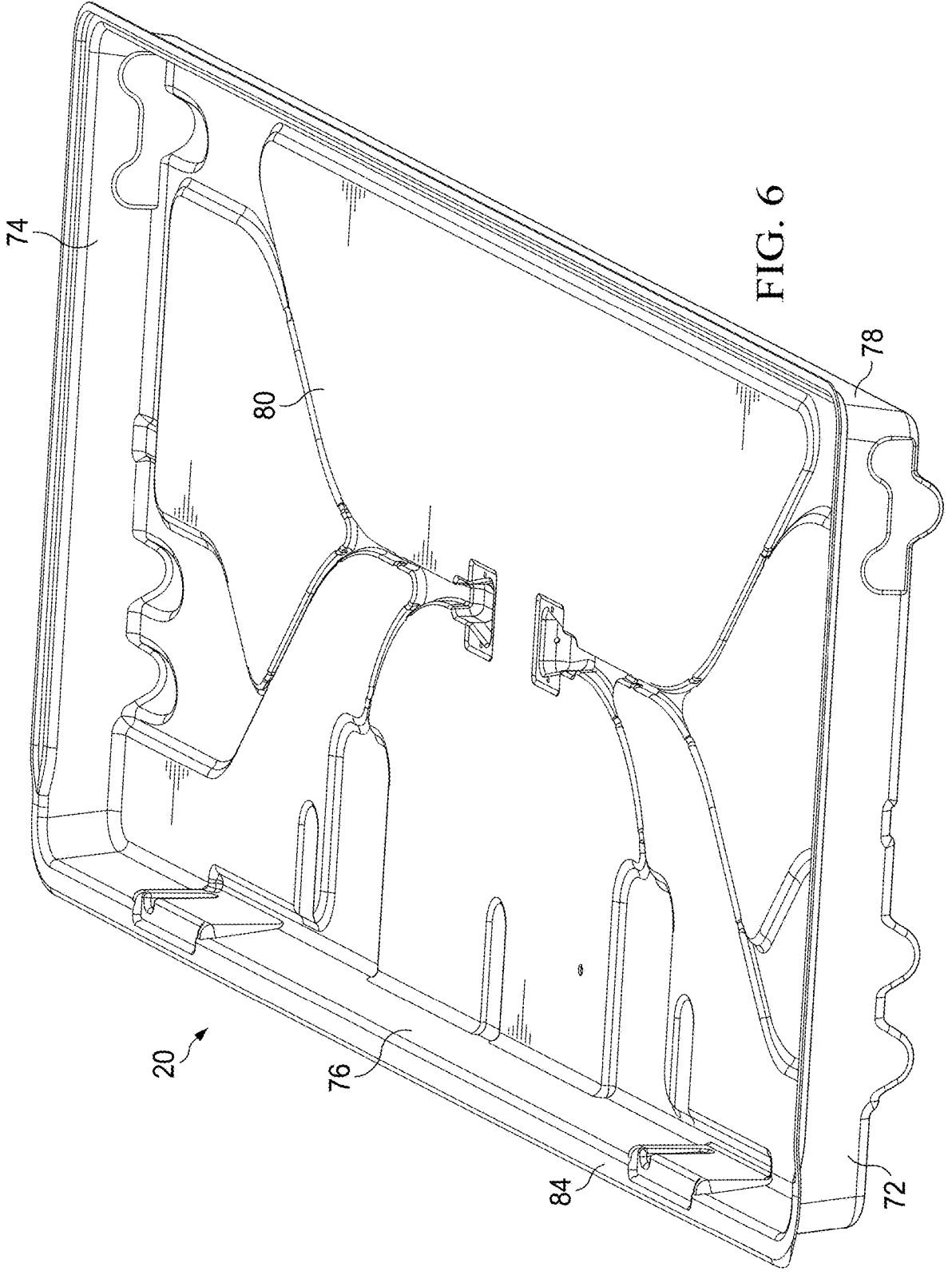
FIG. 6 is a right upper isometric view of the upper shell after thermoforming.
Figure 7:
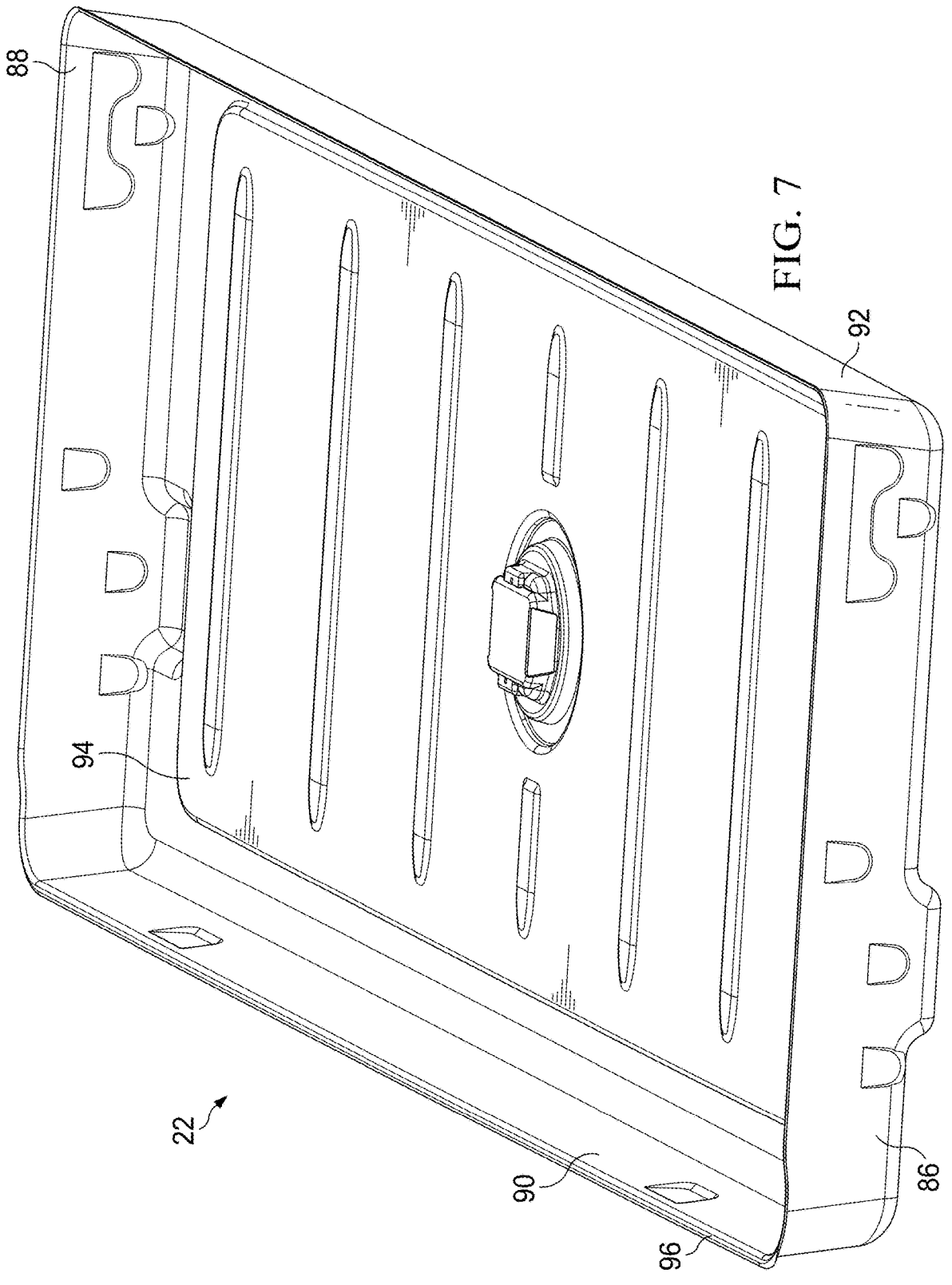
FIG. 7 is a right upper isometric view of the lower shell after thermoforming.

The upper shell 20 and the lower shell 22 that are formed as a result of the thermoforming process are shown in FIGS. 6 and 7, respectively. As illustrated in FIG. 6, the upper shell 20 can include a right side wall 72, a left side wall 74, a front wall 76, a rear wall 78 (collectively "the side walls"), and a bottom wall 80 that extends between the side walls 72, 74, 76, 78. An upper flange 84 can extend laterally outwardly from each of the side walls 72, 74, 76, 78 on an opposite side of the upper shell 20 as the bottom wall 80. As illustrated in FIG. 7, the lower shell 22 can include a right side wall 86, a left side wall 88, a front wall 90, a rear wall 92 (collectively "the side walls"), and a bottom wall 94 that extends between the side walls 86, 88, 90, 92. An upper flange 96 can extend laterally outwardly from each of the side walls 86, 88, 90, 92 on an opposite side of the upper shell 20 as the bottom wall 94. It is to be appreciated that each of the upper shell 20 and the lower shell 22 can be formed as a unitary one-piece construction.

Figure 8:
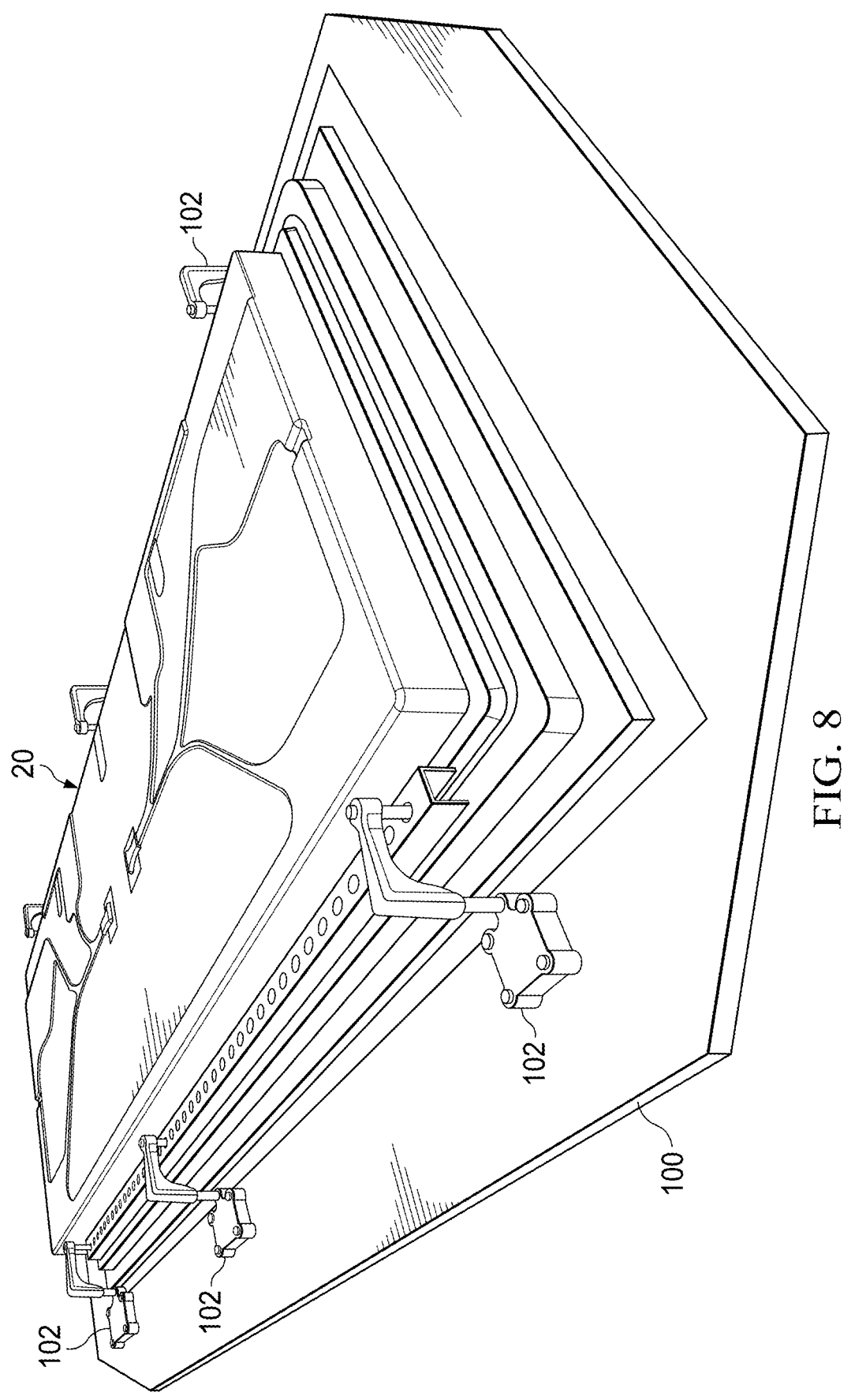
FIG. 8 is an isometric view of the upper shell of FIG. 6 associated with a cooling table.

Referring now to FIG. 8, once the thermoform process for the upper shell 20 is complete, the upper shell 20 can be provided onto a cooling table 100 to allow the upper shell 20 to cool. The cooling table 100 can have a central portion (not shown) that extends between and contacts the side walls 72, 74, 76, 78 and the bottom wall 80 and is similarly shaped as the upper shell 20 (e.g., similar to a corresponding one of the mating forming tools). The cooling table 100 can include lateral clamps 102 that facilitate clamping of the upper shell 20 against the central portion and the rest of the cooling table 100 to prevent deformation of the upper shell 20 during cooling. In one embodiment, the upper shell 20 can be cooled via ambient air. In another embodiment, cooling of the upper shell 20 on the cooling table 100 can be enhanced with forced air (e.g., from a fan) or any of a variety of other suitable enhanced cooling methods. The lower shell 22 can be fitted onto a different cooling table that is configured to interface with the lower shell 22 and facilitate cooling thereof in a similar manner as described above for the upper shell 20. Once the upper shell 20 and the lower shell 22 have been sufficiently cooled (e.g., after about 50 seconds of cooling time), they can be removed from their respective cooling tables by releasing the lateral clamps (e.g., 102).

Figure 9:
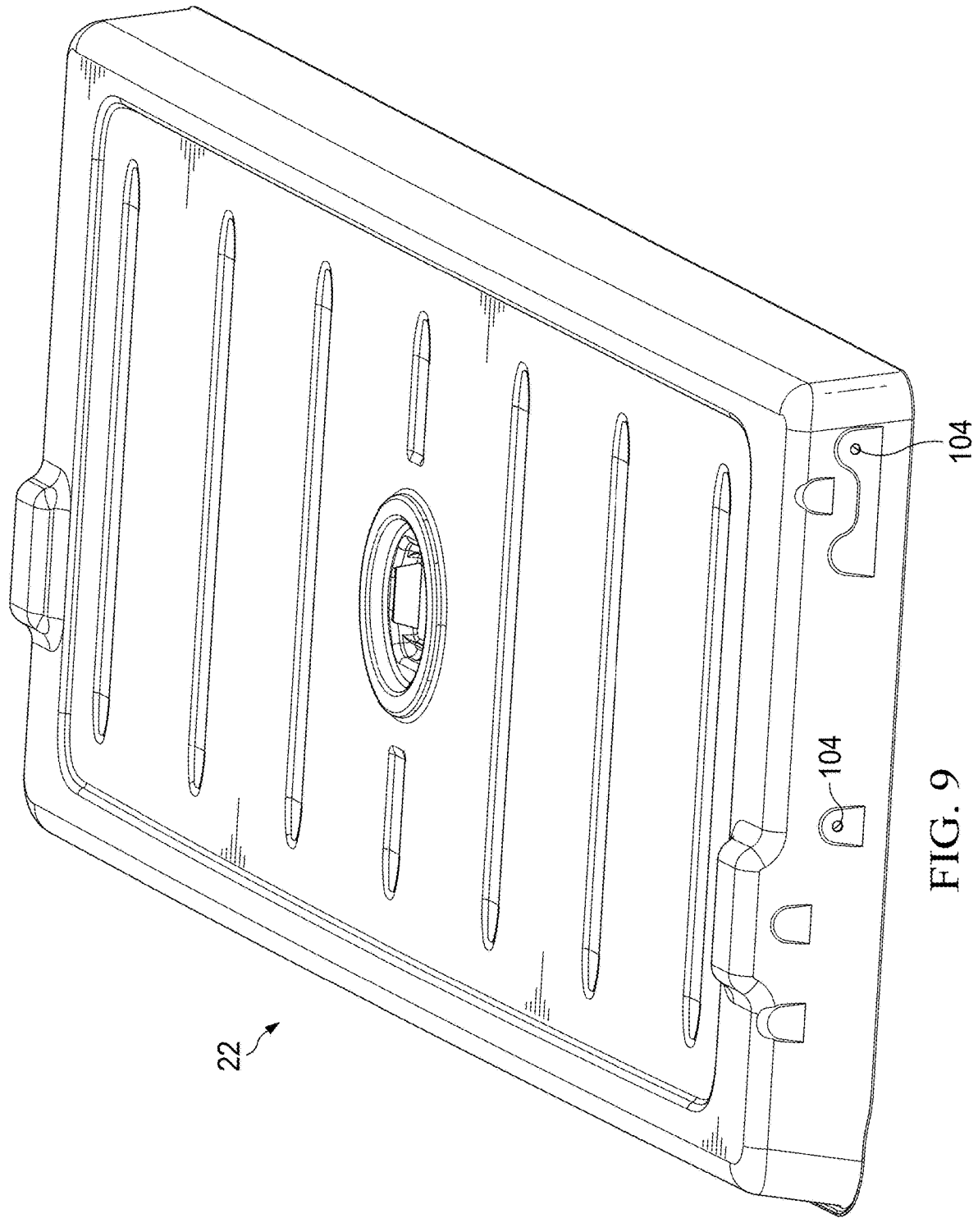
FIG. 9 is a left isometric view of the lower shell of FIG. 7 after being drilled with various holes.
Figure 10:
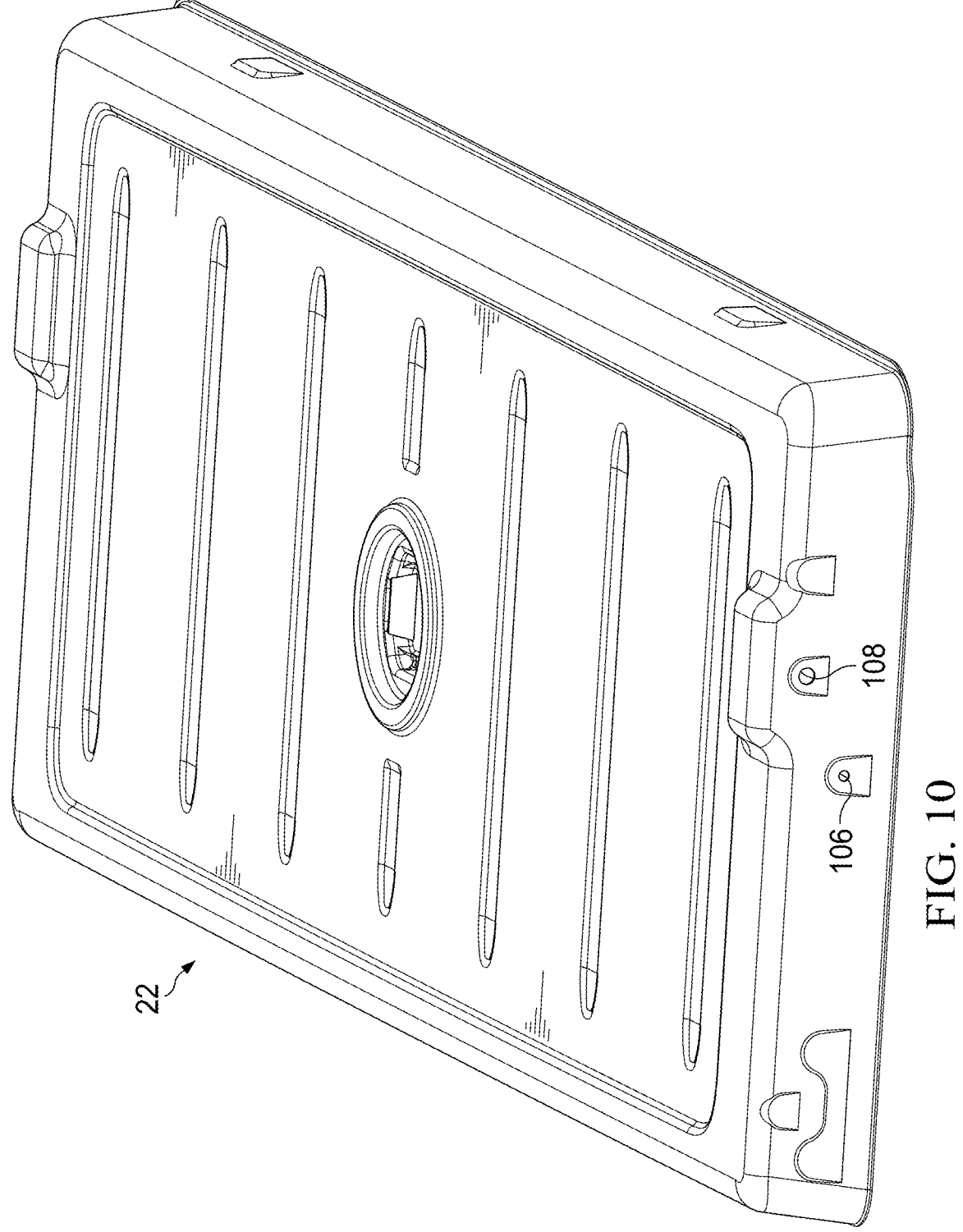
FIG. 10 is a right isometric view of the lower shell of FIG. 9.
Figure 11:
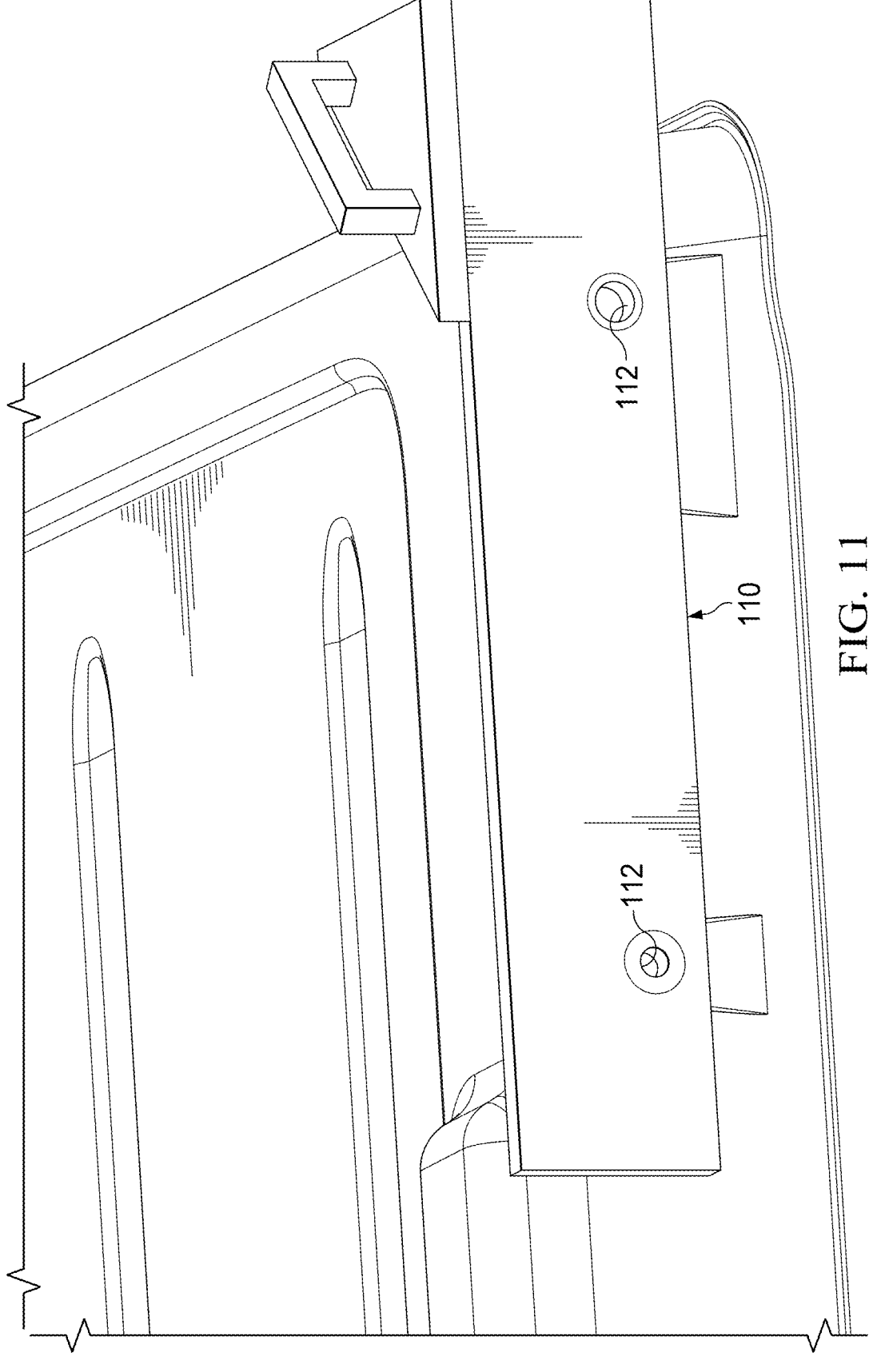
FIG. 11 is an isometric view depicting a left jig used for the drilling the holes shown in FIG. 9.

Referring now to FIGS. 9 and 10, after the lower shell 22 is removed from the cooling table 100, a pair of left vent holes 104 (FIG. 9) can be drilled in the left side wall 88 and a right vent hole 106 and a fill hole 108 (FIG. 10) can be drilled in the right side wall 86. The process for drilling the left and right vent holes 104, 106 and the fill hole 108 is illustrated in FIGS. 10 and 11 and will now be described. As illustrated in FIG. 11, the left vent holes 104 can be drilled into the left side wall 88 through use of a left jig 110 that defines a pair of guide holes 112. Prior to drilling the left vent holes 104, the left jig 110 can be located on the lower shell 22 such that the guide holes 112 are positioned over the respective locations where the left vent holes 104 are to be drilled. The left jig 110 can fit on the lower shell 22 in such a manner that ensures proper and consistent location of the left vent holes 104 along the left side wall 88. Once the left jig 110 is properly aligned on the left side wall 88, the left vent holes 104 can be drilled out through each of the guide holes 112 using a hand operated electric drill (not shown). The left jig 110 can then be removed from the lower shell 22.

Figure 12:
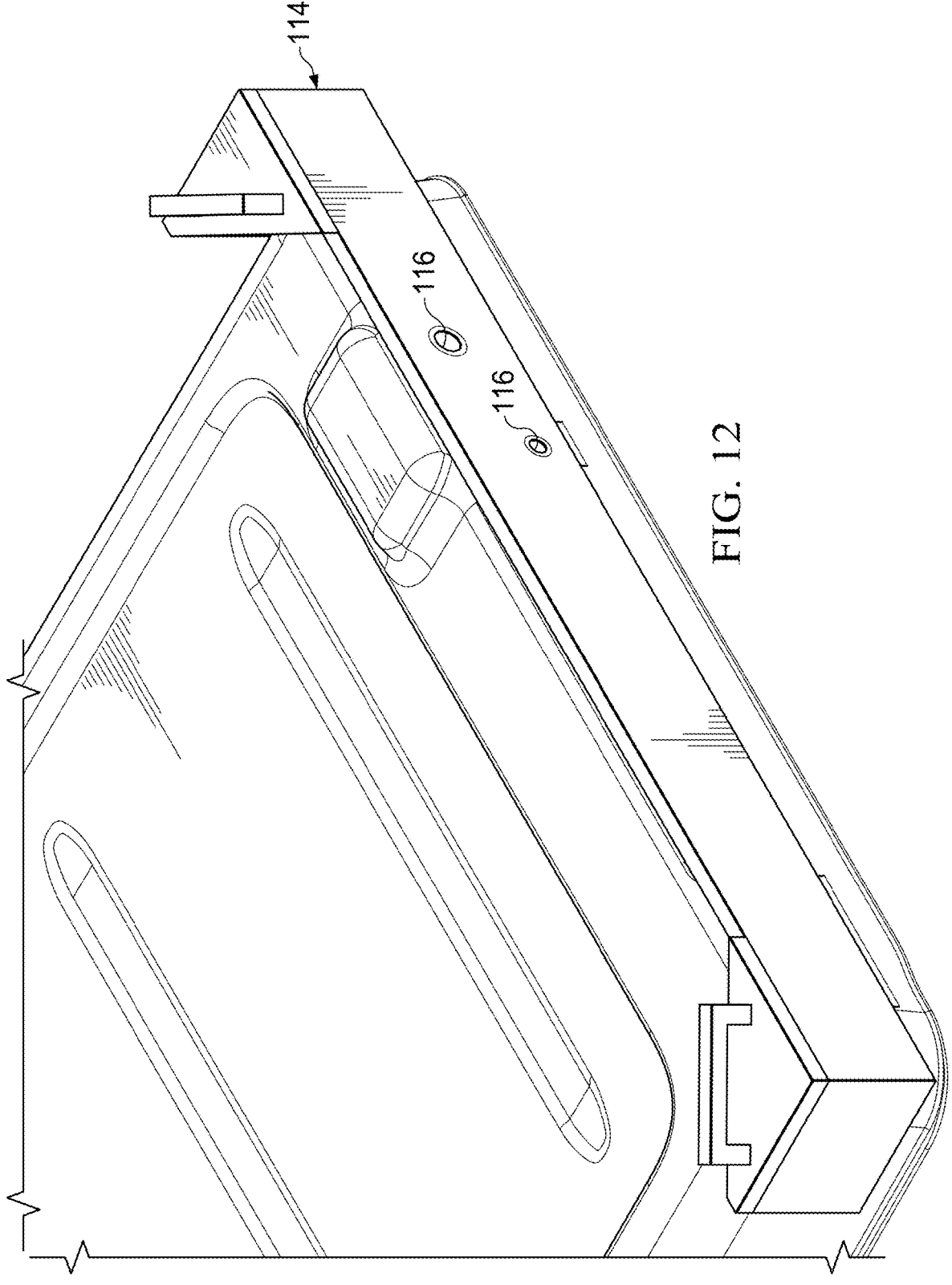
FIG. 12 is an isometric view depicting a right jig used for the drilling the holes shown in FIG. 10.

As illustrated in FIG. 12, the right vent hole 106 and the fill hole 108 can be drilled into the right side wall 86 through use of a right jig 114 that defines a pair of guide holes 116. Prior to drilling the right vent hole 106 and the fill hole 108, the right jig 114 can be located on the lower shell 22 such that the guide holes 116 are positioned over the respective locations where the right vent hole 106 and the fill hole 108 are to be drilled. The right jig 114 can fit on the lower shell 22 in such a manner that ensures proper and consistent location of right vent hole 106 and the fill hole 108 along the right side wall 86. Once the right jig 114 is properly aligned on the right side wall 86, the right vent hole 106 and the fill hole 108 can be drilled out through each of the guide holes 116 using the hand operated electric drill. The right jig 114 can then be removed from the lower shell 22. The left and right vent holes 104, 106 can have a first diameter and the fill hole 108 can have a second diameter than is larger than the first diameter. In one embodiment, the left and right vent holes 104, 106 can have a first diameter of about 7 mm and the fill hole 108 can have a second diameter of about 32 mm. It is to be appreciated that although the left and right vent holes 104, 106 and the fill hole 108 are described as being drilled out manually, other drilling methods are contemplated, such as via an automated process (e.g., via a robot).

Figure 13:
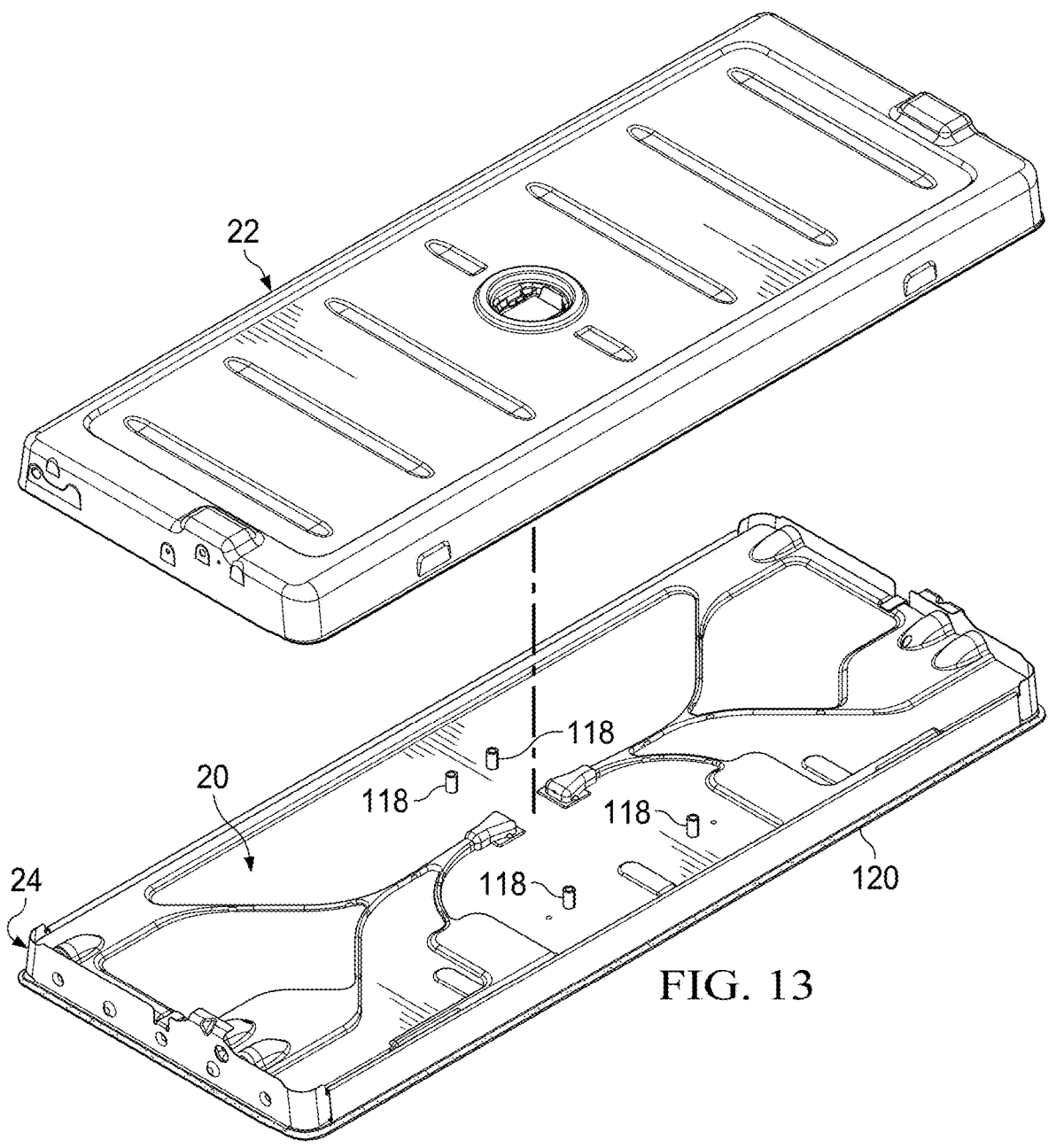
FIG. 13 is a partially exploded view of a support panel that incorporates the upper shell and the lower shell of FIGS. 9 and 10, respectively.

With the drilling of the left and right vent holes 104, 106 and the fill hole 108 complete, as illustrated in FIGS. 9 and 10, the support panel 18 can then be assembled. As illustrated in FIG. 13, to facilitate assembly of the support panel 18, the upper shell 20 can first be positioned upside down and the frame 24 can be installed on the upper shell 20 such that the frame 24 is disposed circumferentially along the side walls 72, 74, 76, 78. A plurality of spacers 118 can be provided on the bottom wall 80 and can extend upwardly from the bottom wall 80. An adhesive 120 can be applied to the upper flange 84 via a manual applicator gun 122 such that the adhesive 120 is applied around the entire circumference of the upper shell 20. In one embodiment, the adhesive 120 can be a two part MMA adhesive that is mixed together during application with the applicator gun. It is to be appreciated, however, that any of a variety of suitable alternative adhesives are contemplated.

Figure 14:
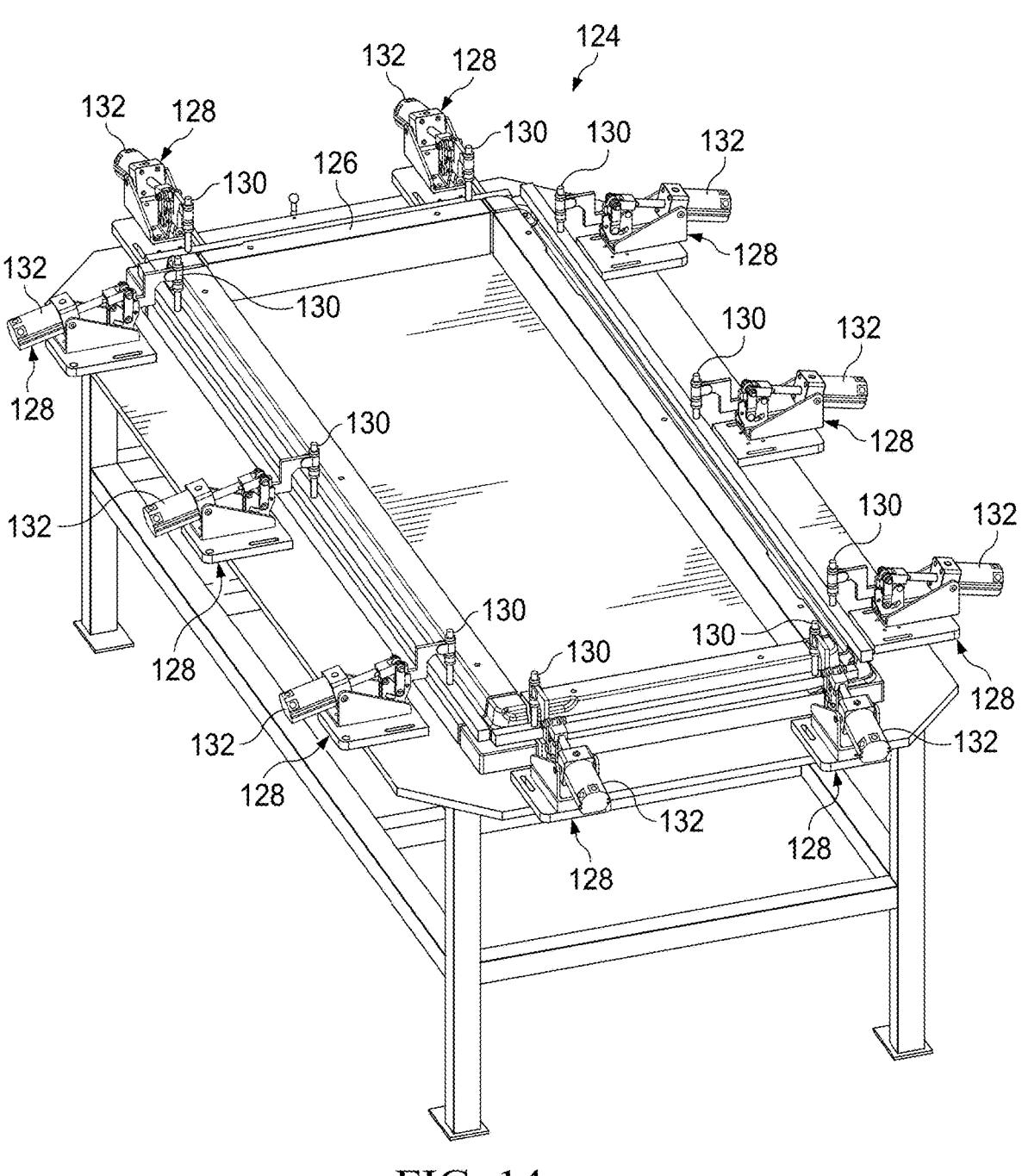
FIG. 14 is an isometric view depicting a curing table.
Figure 15:
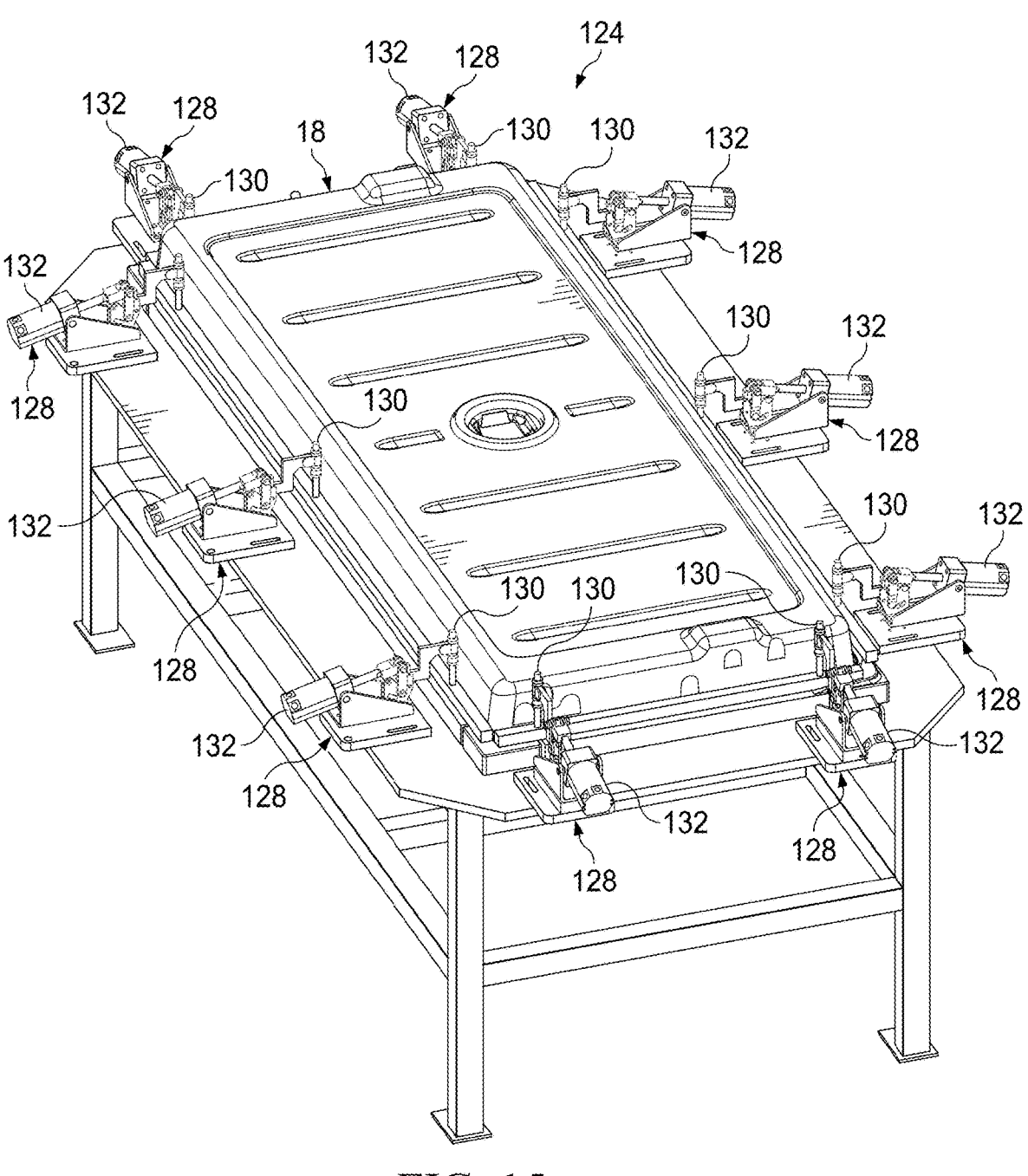
FIG. 15 is an isometric view of the support panel of FIG. 13 associated with the curing table of FIG. 14.

The lower shell 22 can then be turned upside down and installed over the upper shell 20 such that the adhesive 120 is sandwiched between the upper flanges 84, 96 of the upper and lower shells 20, 22. As illustrated in FIGS. 14 and 15, the resulting structure (e.g., the support panel 18) can then be provided on a curing table 124. As illustrated in FIG. 14, the curing table 124 can have a central portion 126 that is similarly shaped as the upper shell 20 (e.g., similar to a corresponding one of the mating forming tools). When the support panel 18 is installed on the curing table 124, as illustrated in FIG. 15, the central portion 126 can extend between the side walls 72, 74, 76, 78 and the bottom wall 80 of the upper shell 20. The curing table 124 can include a plurality of clamping mechanisms 128 that are distributed along the circumference of the curing table 124. Each clamping mechanism 128 can include a clamp 130 and a pneumatic piston 132 that is operably coupled to the clamp 130. The pneumatic piston 132 can be selectively actuated (via compressed air) to facilitate pivoting of the clamp 130 between a clamping position and a released position.

When the support panel 18 is installed on the curing table 124 and the adhesive 120 is still uncured, each of the pneumatic pistons 132 can be actuated to pivot the corresponding clamp 130 into its clamping position such that the clamps 130 apply downward force on to the upper flanges 84, 96. This downward force can compress the upper flanges 84, 96 together to squeeze the adhesive 120 therebetween. The clamps 130 can be held in the clamping position until the adhesive 120 has fully cured (e.g., about 8 minutes). Once the adhesive is cured, the pneumatic pistons can be deactivated to allow the clamps 130 to pivot to their released positions. It is to be appreciated that although the clamping mechanisms 128 are described as being pneumatic-type clamping mechanisms, any of a variety of suitable alternative automated or manual clamping mechanisms are contemplated, such as, for example, electrically actuated clamps or c-clamps.

Figure 16:
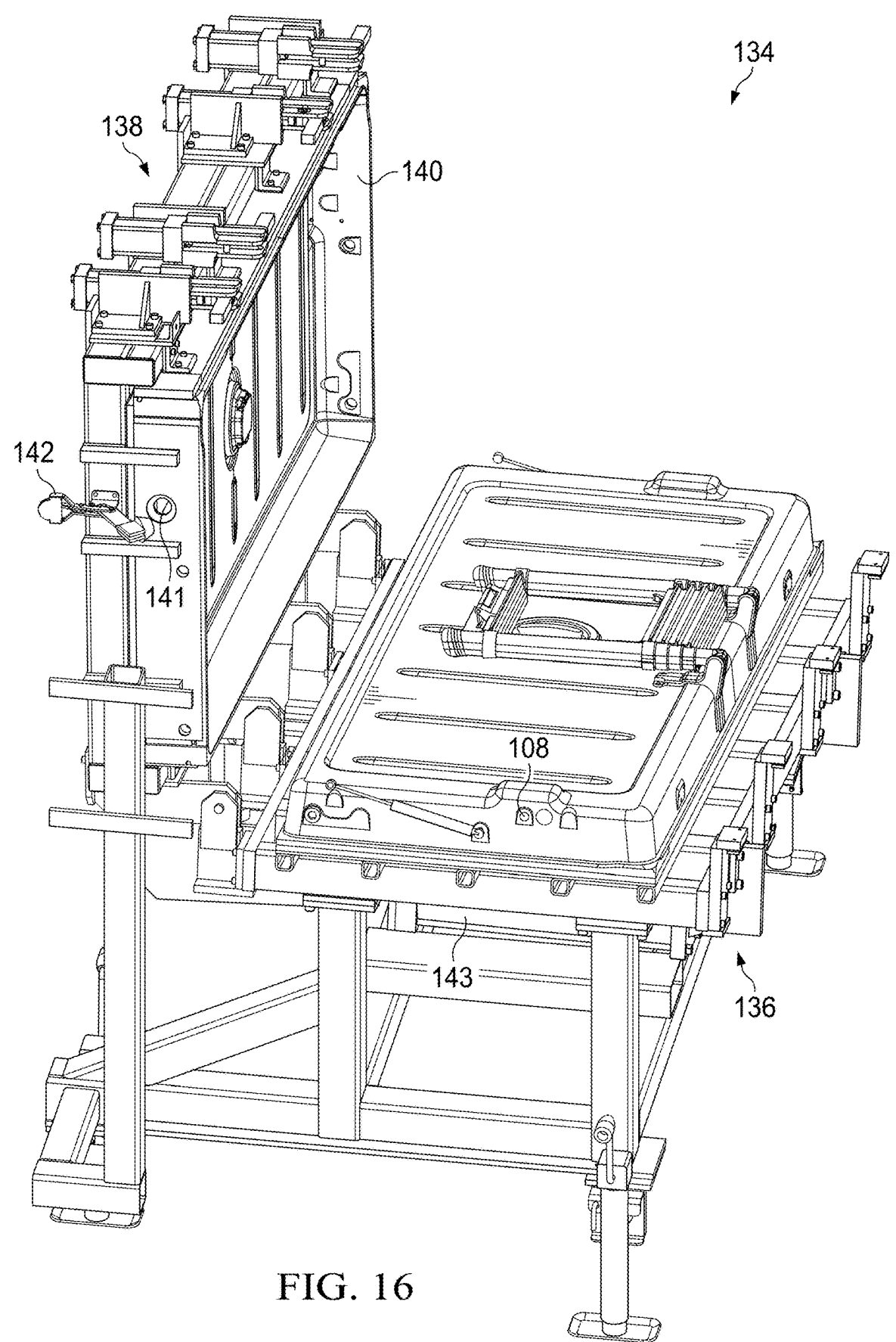
FIG. 16 is an isometric view depicting a foam cure fixture in an opened position.
Figure 17:
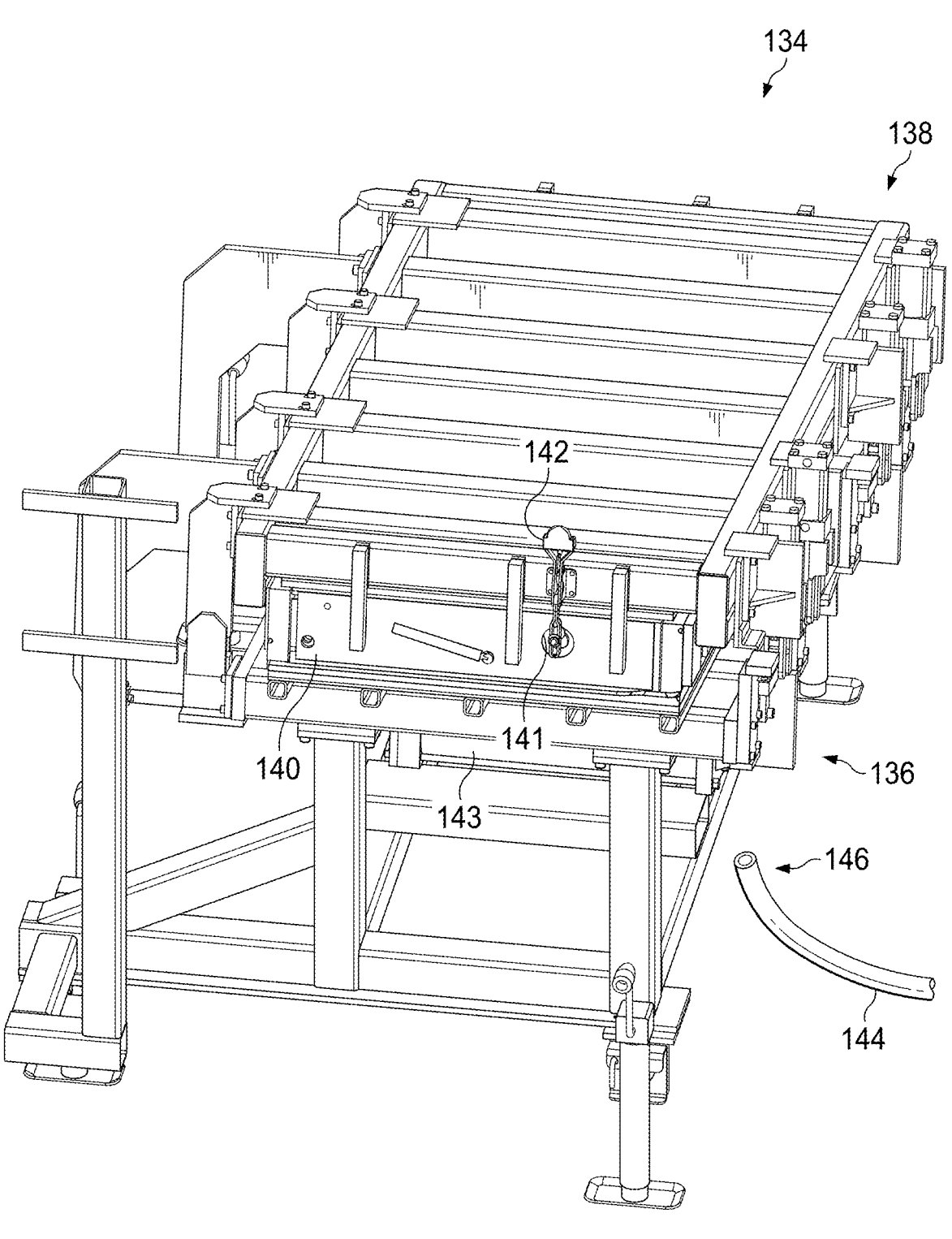
FIG. 17 is an isometric view depicting the foam cure fixture of FIG. 16, but in a closed position.

The support panel 18 can then be removed from the curing table 124 and installed onto a foam cure fixture 134, as illustrated in FIGS. 16 and 17, to allow the support panel 18 to be filled with foam. The foam cure fixture 134 can include a bed 136 and a lid 138 that is pivotally coupled with the bed 136 and is pivotable with respect to the bed 136 between an opened position (FIG. 16) and a closed position (FIG. 17). The bed 136 can include a central portion (not shown) that is similarly shaped as the upper shell 20 (e.g., similar to a corresponding one of the mating forming tools) and thus interfaces with each of the side walls 72, 74, 76, 78 and the bottom wall 80. The lid 138 can include a cap 140 that has a similar profile as the exterior of the lower shell 22. The cap 140 can define a fill port 141 and a plug assembly 142 that can be selectively pivoted between a closed position (as illustrated in FIG. 16) and an opened position (as illustrated in FIG. 17).

As illustrated in FIG. 16, the lid 138 can initially be provided in the opened position when installing the support panel 18 on the bed 136. Once the support panel 18 is properly installed on the bed 136, the lid 138 can be pivoted to the closed position, as illustrated in FIG. 17, such that the support panel 18 is sandwiched between the bed 136 and the cap 140. In one embodiment, the foam cure fixture 134 can include a plurality of pneumatic pistons 143 that are operably coupled to the lid 138 and can be selectively actuated (via compressed air) to facilitate pivoting of the lid 138 between the opened position and the closed position. In such an embodiment, the pneumatic pistons 143 can be configured to selectively lock the lid 138 in the closed position (e.g., via an air lock) such that the support panel 18 is effectively compressed between the bed 136 and the lid 138. In another embodiment, the lid 138 can be manually pivoted between the opened position and the closed position and locked in place with manual latches or other locking arrangements that facilitate compression of the support panel 18 between the bed 136 and the lid 138.

Figure 18:
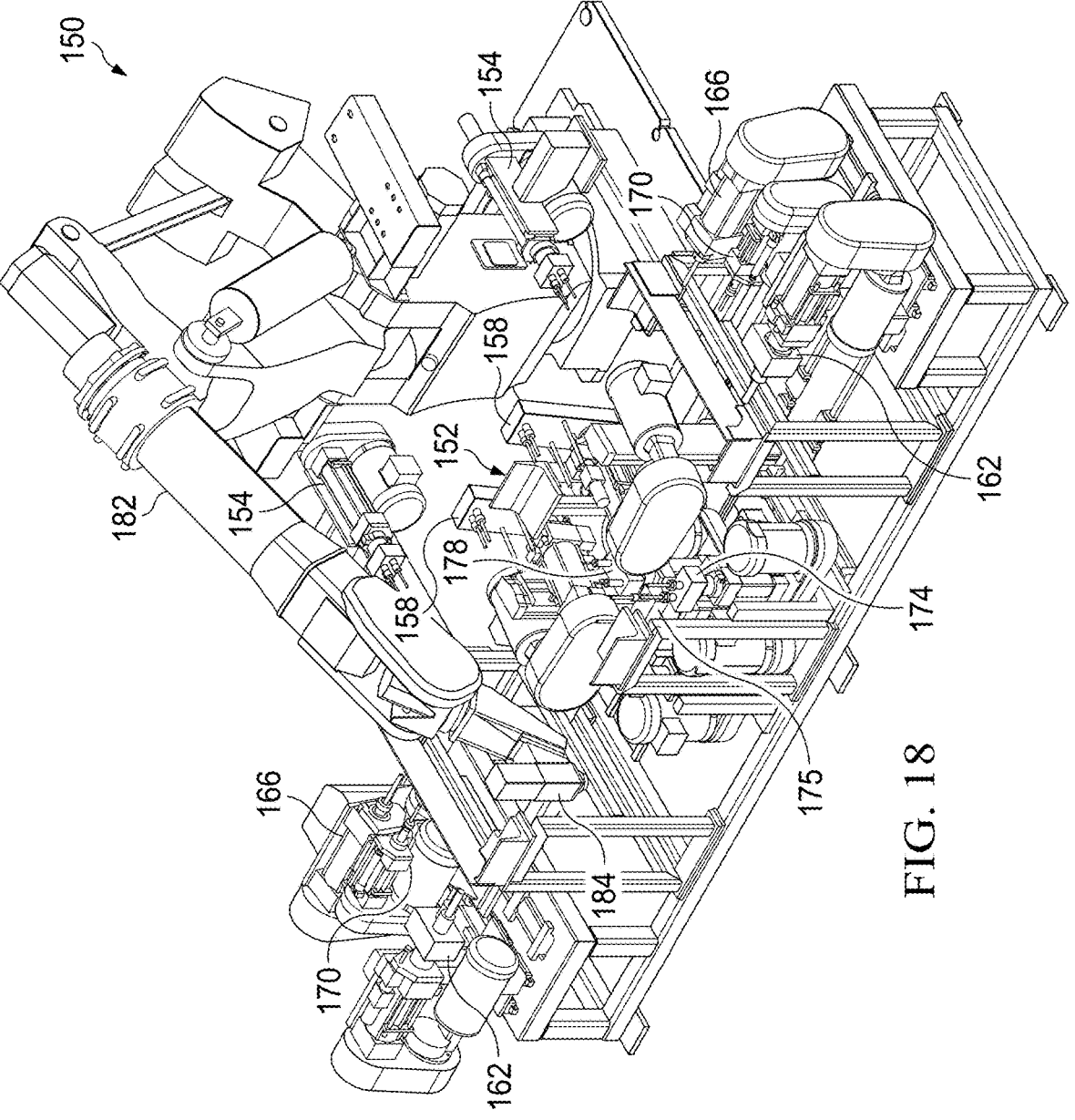
FIG. 18 is an isometric view depicting a drilling and trim machine for the support panel.

Referring now to FIG. 17, when the lid 138 is in the closed position, the fill port 141 and the fill hole 108 can be substantially aligned to define a passageway though which the support panel 18 can be filled with expandable foam. The plug assembly 142 can be provided in the opened position to allow access to the fill port 141. In one embodiment, as illustrated in FIG. 18, the support panel 18 can be filled from a foam dispensing hose 144 that includes a tip portion 146 from which foam can be dispensed. The foam dispensing hose 144 can be associated with a foam machine (not shown) that is configured to supply expandable foam to the foam dispensing hose 144 for dispensation from the tip portion 146. To fill the support panel 18 with foam, the tip portion 146 can first be inserted into the fill port 141 and the fill hole 108 far enough that the tip portion 146 extends beyond the fill port 141 and into the support panel 18. The foam machine can then be activated (via a trigger (not shown) or an automated controller) to dispense the expanding foam through the foam dispensing hose 144 and the tip portion 146 and into the support panel 18. As the support panel 18 is filled with expanding foam, any air displaced by the expanding foam can be purged through the left and right vent holes 104, 106. Once the support panel 18 is sufficiently filled, the plug assembly 142 can be pivoted to the closed position to prevent any expanding foam from escaping from the fill port 141. The lid 138 can remain in the closed position until the expanding foam has properly expanded and cured. During this time, as the expanding foam expands and cures, the bed 136 and the lid 138 cooperate to maintain compression on the support panel 18 to force any air displaced by the expanding foam out of the left and right vent holes 104, 106 rather than causing deformation to the support panel 18. In one embodiment, the foam machine can comprise a RIM-Cell 100 foam machine and the expanding foam can be a two-part ISO/Polyurethane foam that is mixed by the foam machine during dispensation and has a cure time of about 15 minutes. It is to be appreciated, however, that any of a variety of suitable alternative foam dispensing machines and expanding foam compositions are contemplated.

Figure 19:
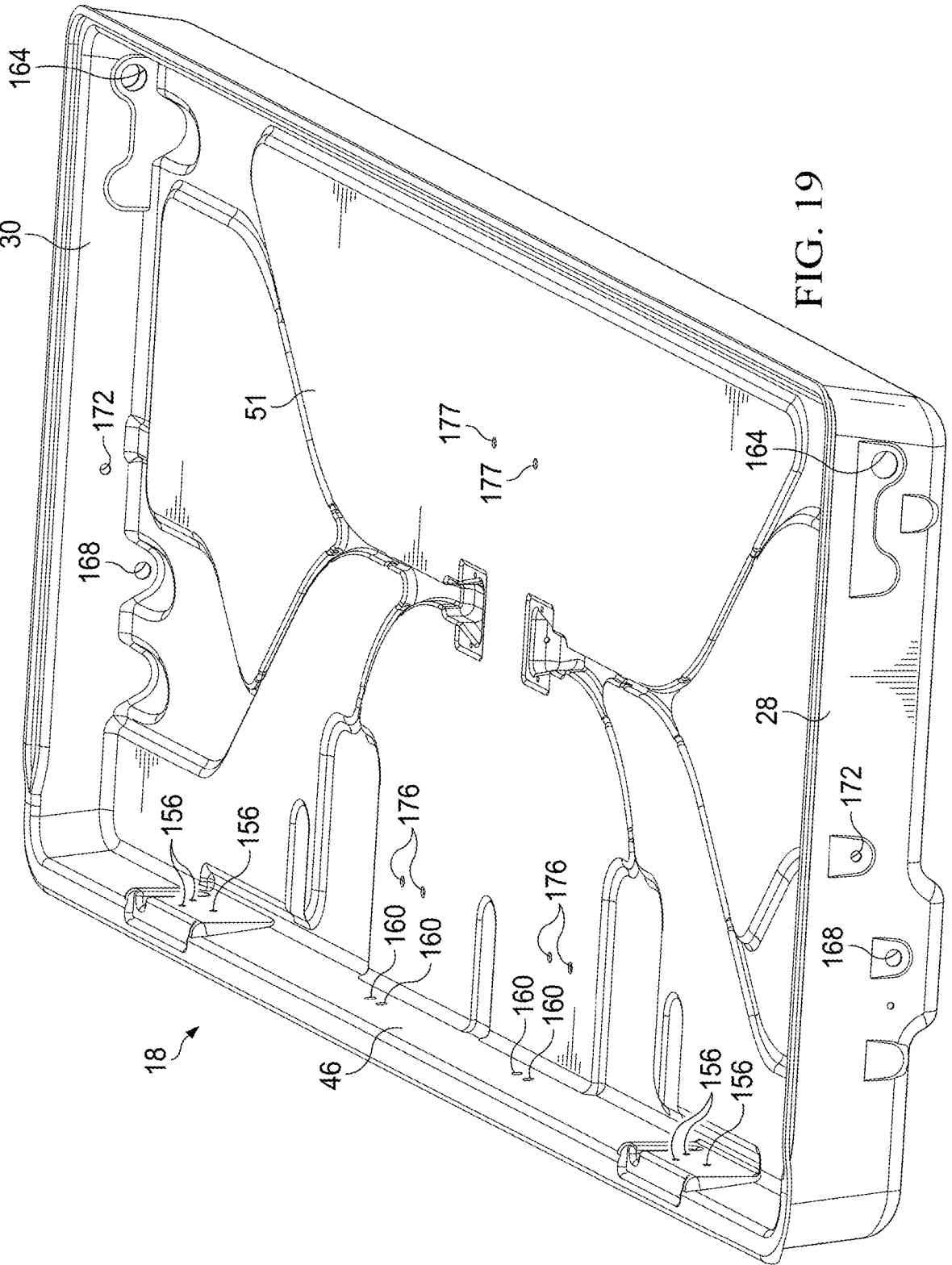
FIG. 19 is a right isometric view of the support panel of FIG. 15 after being drilled and trimmed by the drilling and trim machine of FIG. 18.
Figure 20:
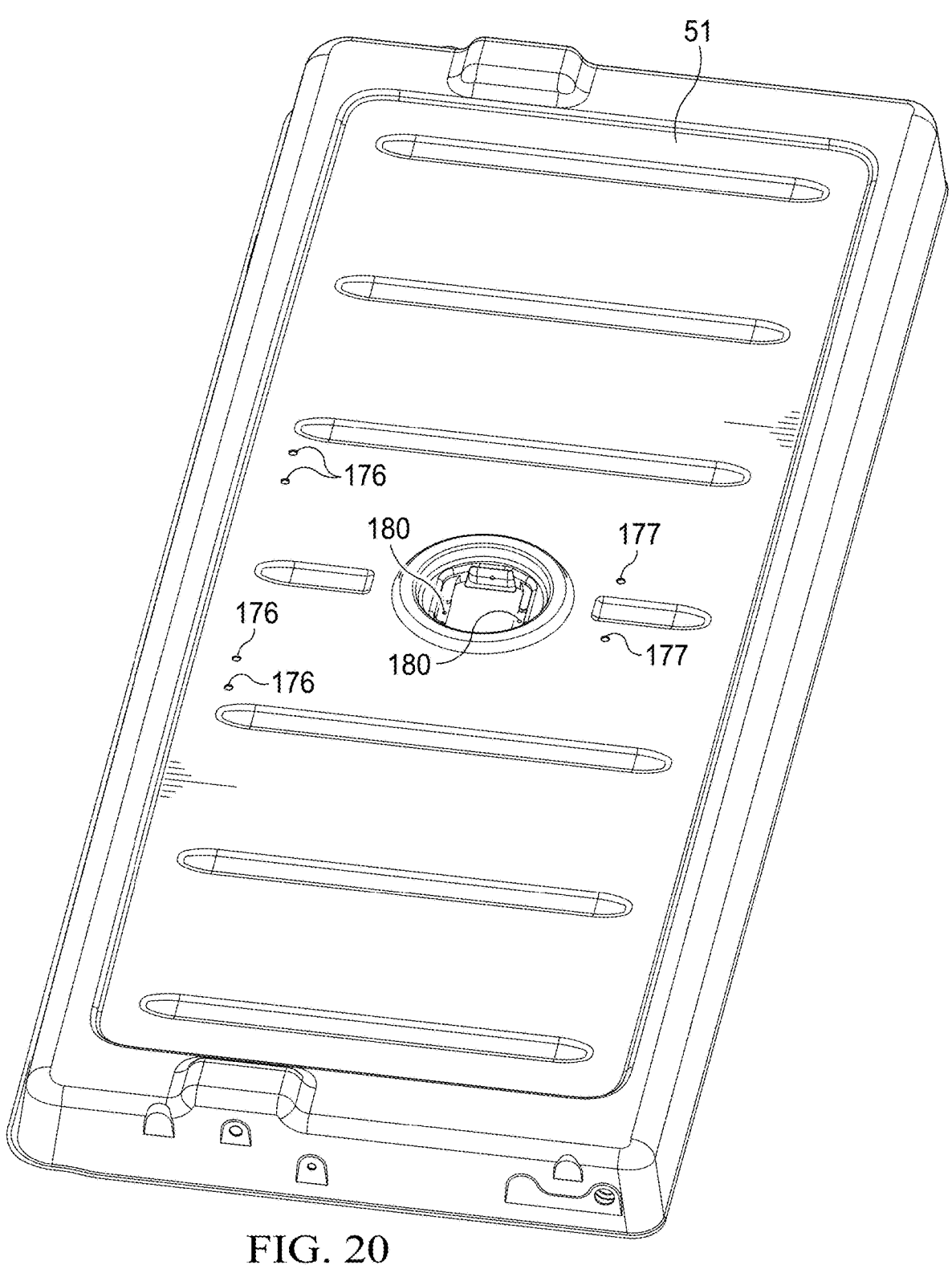
FIG. 20 is a left isometric view of the support panel of FIG. 19.

Once the expanding foam has cured, the lid 138 can be pivoted to the opened position (via the pneumatic pistons 143) to allow the support panel 18 to be removed from the foam cure fixture 134. The support panel 18 can then be installed onto a drilling and trim machine 150, as illustrated in FIG. 18, that can trim the support panel 18 and drill various mount holes into the support panel 18 via an automated process, as will be described in further detail below. The drilling and trim machine 150 can include a support bed 152 that can support the support panel 18 during the trimming and drilling operation. For purposes of illustration, the support panel 18 is shown in FIGS. 19 and 20 apart from the drilling and trim machine 150 for ease of reference.

Referring now to FIG. 18, the drilling and trim machine 150 can include a pair of latch drills 154 that are vertically slidable relative to the support bed 152. Each of the latch drills 154 can facilitate drilling of three latch mount holes 156 in the front wall 46 (see FIG. 19). The drilling and trim machine 150 can also include a pair of front ladder drills 158 that are disposed between the latch drills 154 and are vertically slidable relative to the support bed 152. Each of the front ladder drills 158 can facilitate drilling of two front ladder mount holes 160 in the front wall 46 (see FIG. 19). The drilling and trim machine 150 can also include a pair of hinge drills 162 that are disposed on opposite sides of the support bed 152 and are vertically slidable relative to the support bed 152. The hinge drills 162 can facilitate drilling of two hinge mount holes 164 in each of the right wall 28 and the left wall 30 (see FIG. 19). The drilling and trim machine 150 can also include a pair of shot pin drills 166 that are disposed on opposite sides of the support bed 152 and are vertically slidable relative to the support bed 152. The shot pin drills 166 can facilitate drilling of a shot pin mount hole 168 in each of the right wall 28 and the left wall 30 (see FIG. 19). In one embodiment, the shot pin drills 166 can be configured to redrill one of the left vent holes 104 and the right vent hole 106 to a larger diameter (e.g., from a 7 mm hole to a 16 mm hole).

Still referring to FIG. 18, the drilling and trim machine 150 can include a pair of ball-stud drills 170 that are disposed on opposite sides of the support bed 152 and are each disposed between respective ones of the hinge drills 162 and the shot pin drills 166. The ball-stud drills 170 can vertically slidable relative to the support bed 152 and can facilitate drilling of a ball-stud mount hole 172 in each of the right wall 28 and the left wall 30 (see FIG. 19). In one embodiment, one of the ball-stud drills 170 can be configured to redrill one of the vent holes 104 to a larger diameter (e.g., from a 7 mm hole to a 10 mm hole). The drilling and trim machine 150 can include two lateral bottom ladder drills 174 (one shown) that are disposed beneath the support bed 152 and are vertically and horizontally slidable relative to the support bed 152. Each lateral bottom ladder drill 174 can facilitate drilling of two lateral bottom ladder mount holes 176 in the bottom wall 51 (see FIGS. 19 and 20). The drilling and trim machine 150 can include a central bottom ladder drill 175 (one shown) that is disposed beneath the support bed 152 and is vertically slidable relative to the support bed 152. The central bottom ladder drill 175 can facilitate drilling of a pair of central bottom ladder mount holes 177 in the bottom wall 51 (see FIGS. 19 and 20). The drilling and trim machine 150 can also include a handle drill 178 that is disposed beneath the support bed 152 and is horizontally slidable relative to the support bed 152. The handle drill 178 can facilitate drilling of two handle mount holes 180 in the bottom wall 94 of the lower shell 22 (see FIG. 20). The drilling and trim machine 150 can include a robotic trim arm 182 that includes a trimmer head 184. The robotic trim arm 182 can be configured to trim an upper flange (e.g., the combination of 84, 96) of the support panel 18 to a desired shape and size. It is to be appreciated that operation of the drilling and trim machine 150 can be fully automated such that, once the support panel 18 is loaded onto the support bed 152, the trimming and drilling operations described above can be controlled via a PCU or other similar controller.

Once the drilling and trimming process with the drilling and trim machine 150 is complete, the support panel 18 can be fitted with hardware using the mount holes drilled by the drilling and trim machine 150. In particular, the latching mechanisms 38 can be mounted to the front wall 46 at the latch mount holes 156 with fasteners. Each of the hinge assemblies 26 can be mounted to either of the right wall 28 or the left wall 30 by attaching the hinge brackets 32 at corresponding ones of the hinge mount holes 164 with fasteners and attaching a ball stud (not shown) of the lift support member 36 at a corresponding one of the ball-stud mount hole 172. The shot pins 44 can be mounted to either of the right wall 28 or the left wall 30 such that each shot pin 44 is aligned with a corresponding one of the shot pin mount holes 168. The ladder 50 and corresponding front and rear plates 52, 54 can be mounted to the front wall 46 and the bottom wall 51 at the corresponding ladder mount holes 160, 176, 177 with fasteners. The release handle 40 can be mounted to the bottom wall 51 at the handle mount holes 180 and the cables 48 can be installed between the release handle 40 and the shot pins 44. It is to be appreciated that the fasteners described above for attaching each component can be a releasable fastener (e.g., a threaded fastener) or a permanent fastener (e.g., a rivet) or some combination thereof.

Figure 21:
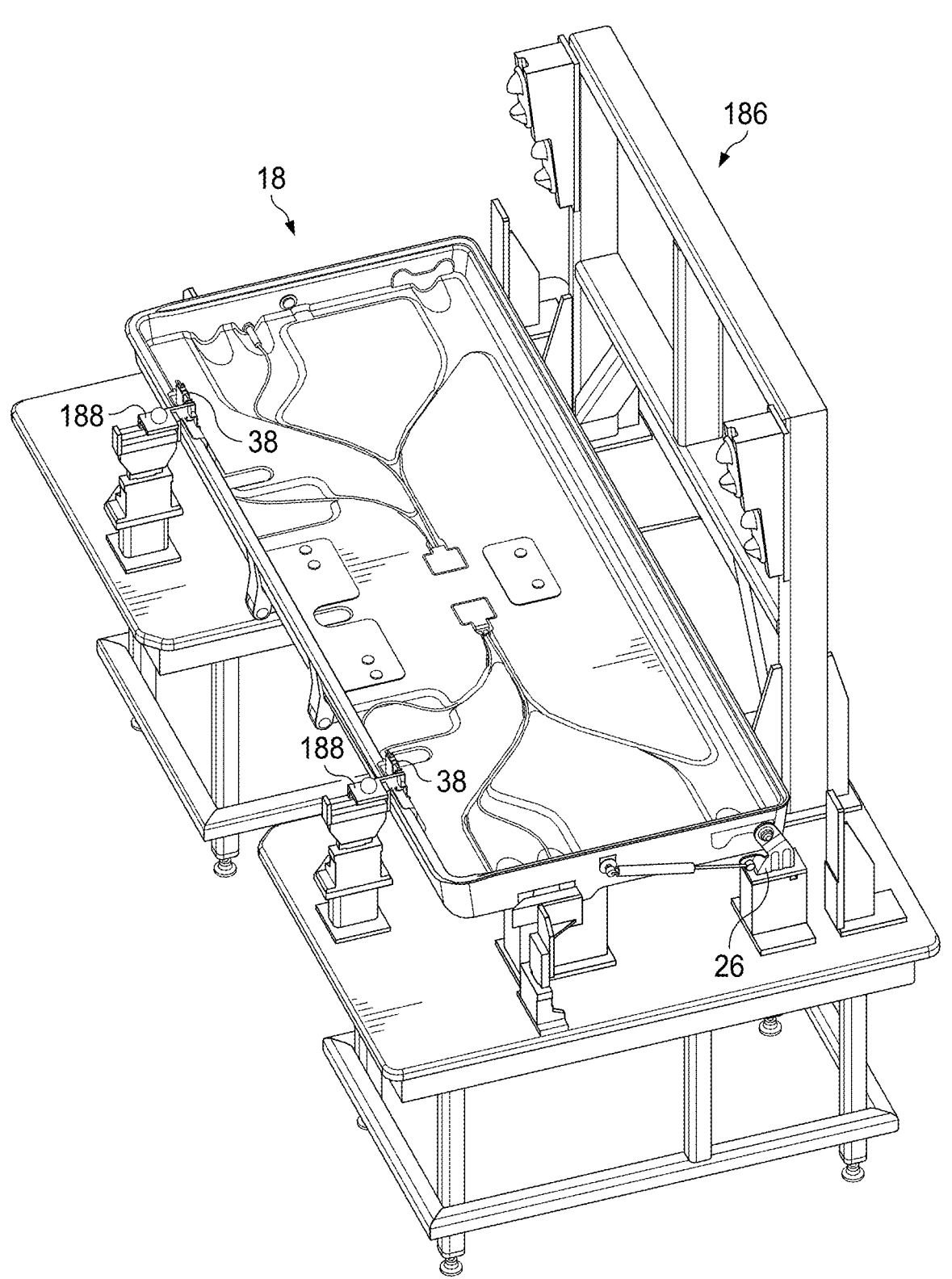
FIG. 21 is an isometric view of an assembly panel associated with the support panel of FIGS. 19 and 20.

Referring now to FIG. 21, in one embodiment, an assembly table 186 can be provided that can support the support panel 18 during assembly of the components thereto. The hinge assemblies 26 can be mounted to the assembly table 186 to allow the support panel 18 to be easily pivoted into its stowed and deployed positions to allow for ease of access to all of the components and fastening locations (e.g., mount holes) during assembly. The assembly table 186 can also include a pair of latch pins 188 that ensure proper alignment of the latching mechanisms 38 during assembly thereof.

Figure 22:
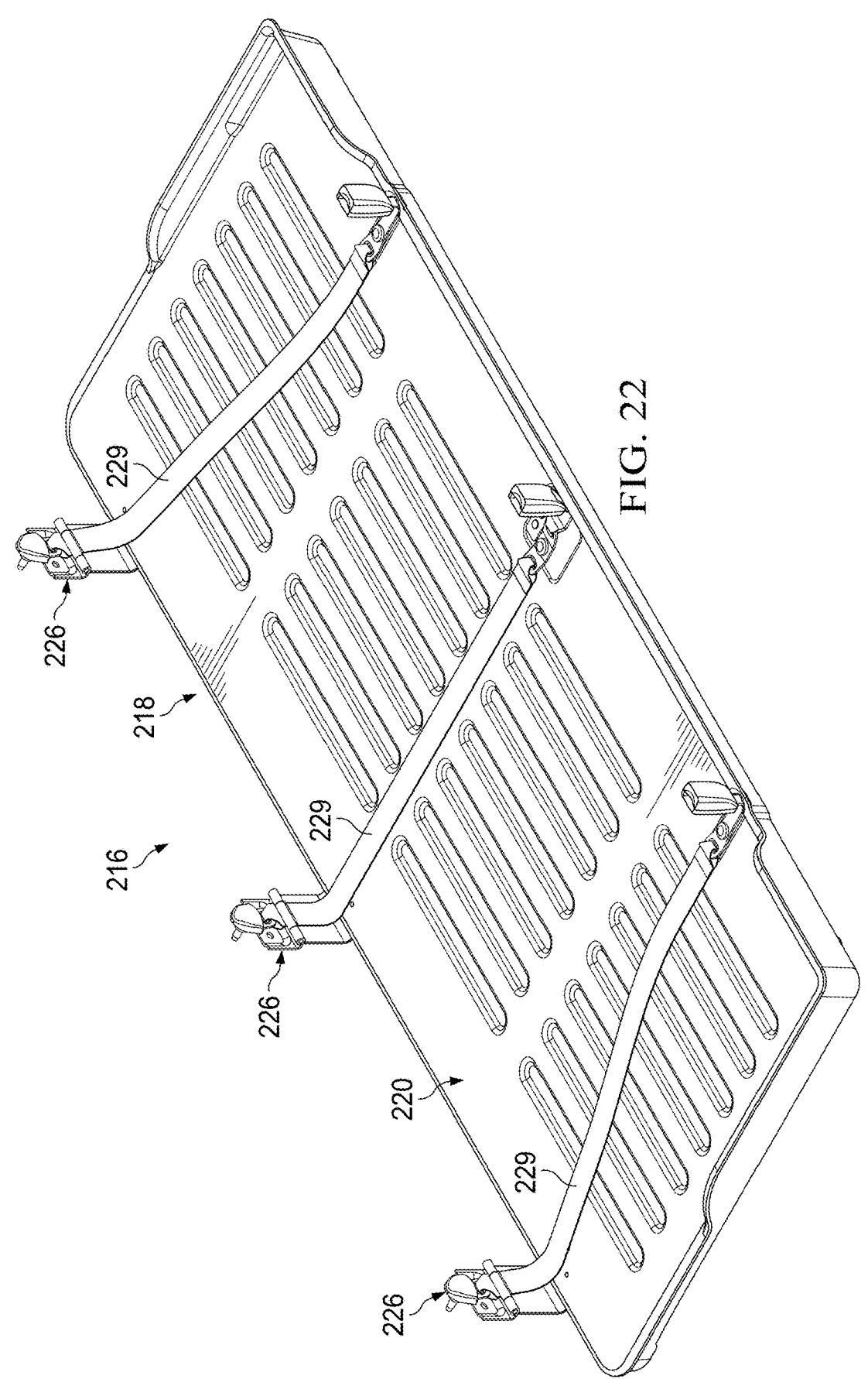
FIG. 22 is an upper isometric view depicting a bunk assembly for the vehicle of FIG. 1, in accordance with another embodiment.
Figure 23:
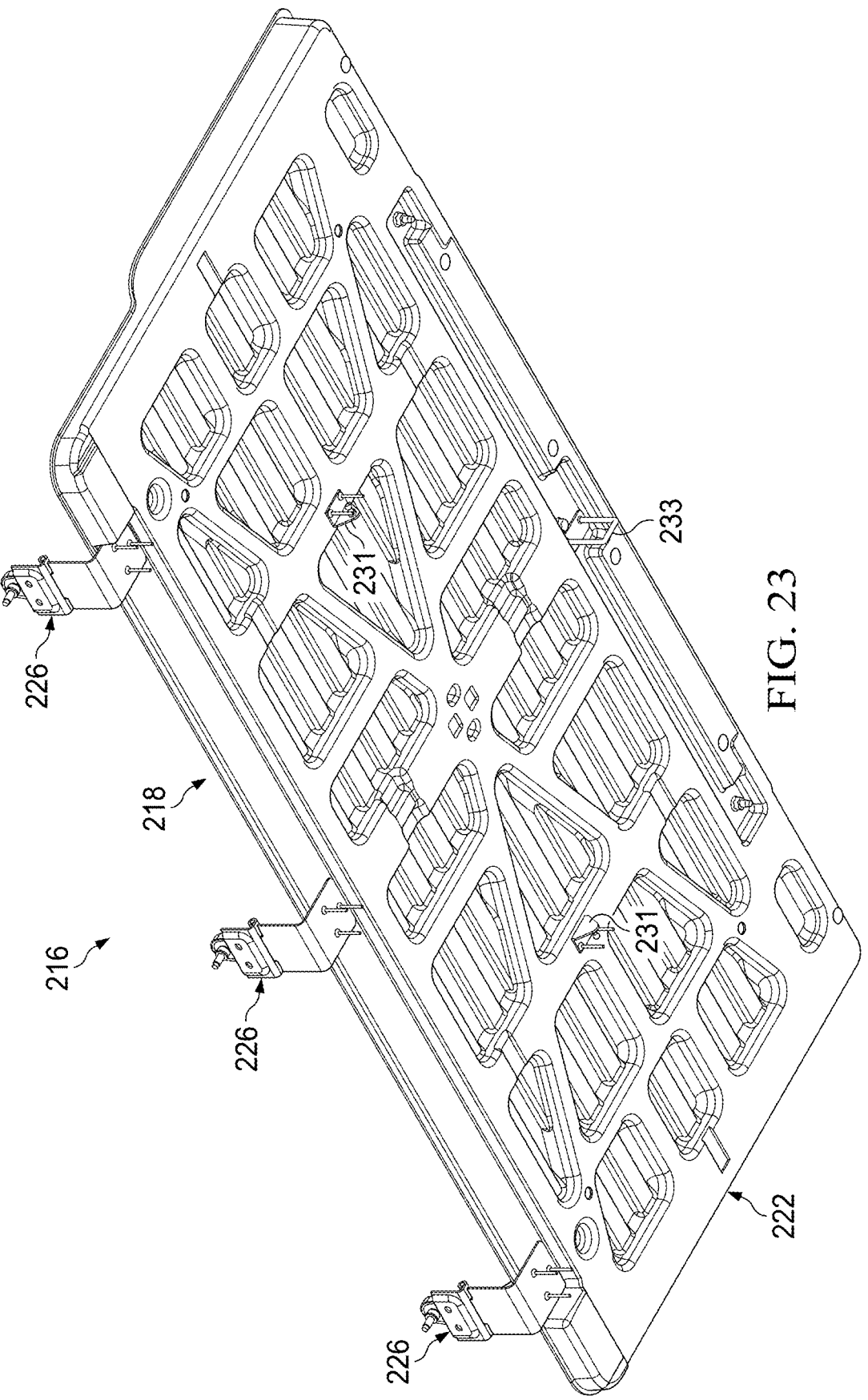
FIG. 23 is a lower isometric view of the bunk assembly of FIG. 22.
Figure 24:
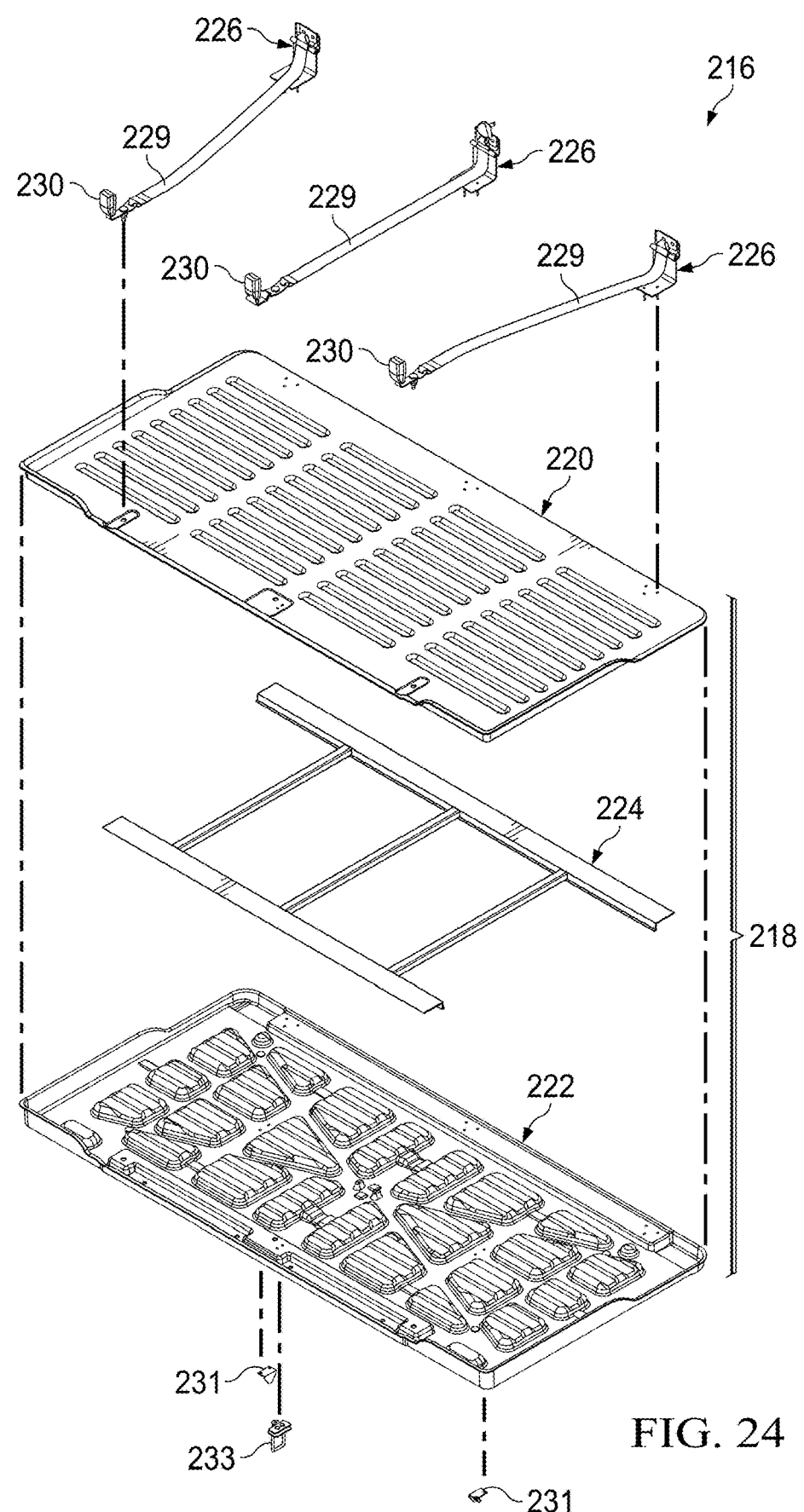
FIG. 24 is an exploded view of the bunk assembly of FIG. 22.

Referring now to FIGS. 22-24, a bunk assembly 216 is illustrated that can be pivotally coupled to the rear wall of the sleeper cabin 14 (FIG. 1). The bunk assembly 216 can be pivotable between a stowed position and a deployed position. The bunk assembly 16 can be stored in the stowed position during driving of the on-highway truck 10 and can be pivoted into the deployed position when the on-highway truck 10 is parked to accommodate a sleeping passenger. In one embodiment, the bunk assembly 216 can be provided below the bunk assembly 16 such that the bunk assembly 16 is an upper bunk and the bunk assembly 216 is a lower bunk.

The bunk assembly 216 can include a support panel 218 that includes an upper shell 220 (FIGS. 22 and 24), a lower shell 222, and a frame 224 that is sandwiched between the upper shell 220 and the lower shell 222. Three hinges 226 can be coupled to the support panel 218 to facilitate pivoting of the bunk assembly 216 between the stowed position and the deployed position. Three restraints 229 (FIG. 24) can be routed over the upper shell 220 and configured to facilitate selective restraint of a sleeping passenger. Each of the restraints 229 can include a buckle 230.

As illustrated in FIGS. 23 and 24, the bunk assembly 216 can include a pair of ball stud brackets 231 and a striker loop 233 that are coupled to the support panel 218 and extend downwardly therefrom. The ball stud brackets 231 and the striker loop 233 can cooperate to facilitate selective latching of the bunk assembly 216 in the deployed position.

One example of a method of manufacturing the bunk assembly 216 will now be described with reference to FIGS. 25-30. First, each of the upper shell 20 and the lower shell 22 can be formed via a thermoforming process that is similar to the thermoforming process described above for the bunk assembly 16 except that a four station rotary thermoforming machine (not shown) is used. Two sheets of raw material (e.g., 68 in FIG. 5) are provided in the four station rotary thermoforming machine and heated. The lower shell 222 can be formed on a lower platen via a vacuum. The frame 224 can then be located on the lower shell 222 and the upper shell 220 can be formed on an upper platen that is positioned above the lower shell 222. The upper and lower platens can then be pressed together to heat fuse the upper and lower shells 220, 222 together to form the support panel 218.

Figure 25:
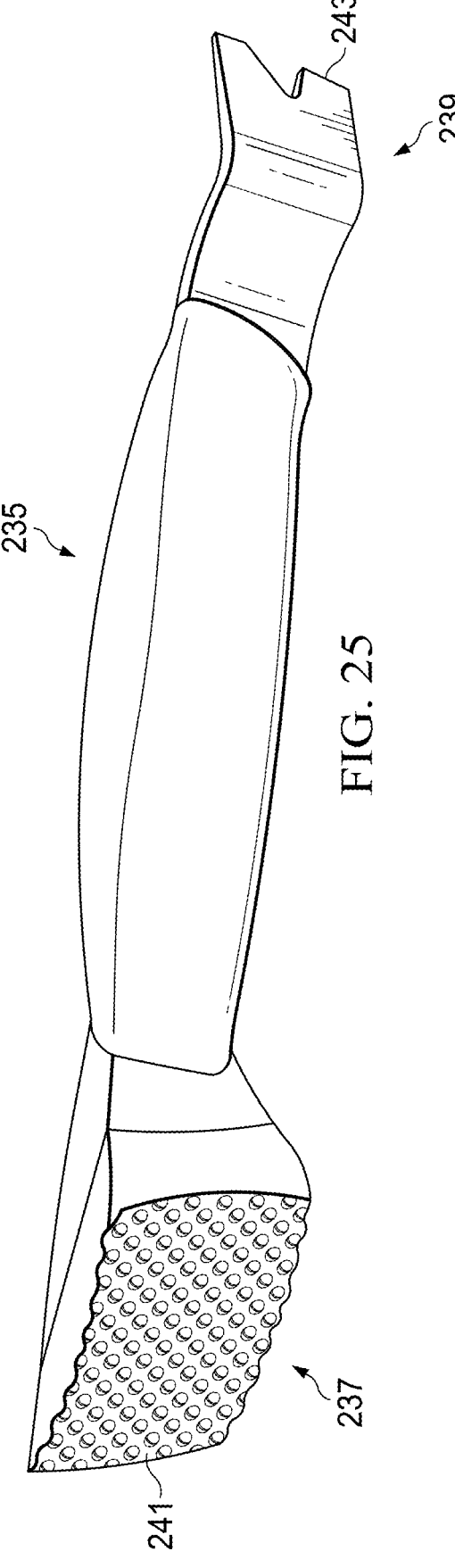
FIG. 25 is an isometric view depicting a hand tool for a support panel of the bunk assembly of FIG. 22.

While the support panel 218 is still warm, the perimeter can be trimmed with a carbide rotary cutting tool to remove any excess material. Once trimmed, the perimeter can be deburred with a deburring tool and shaved with a surform shaver. In one embodiment, the deburring and shaving can be completed with a hand tool 235 as illustrated in FIG. 25. The hand tool 235 can have a surform shaving end 237 and a deburring end 239. The surform shaving end 237 can have a surform shaving surface 241 that can be run along the perimeter of the support panel 218 to facilitate saving of excess material therefrom. The deburring end 239 can have a v-shaped notch 243 that can be run along the perimeter of the support panel 218 to facilitate deburring thereof.

Figure 26:
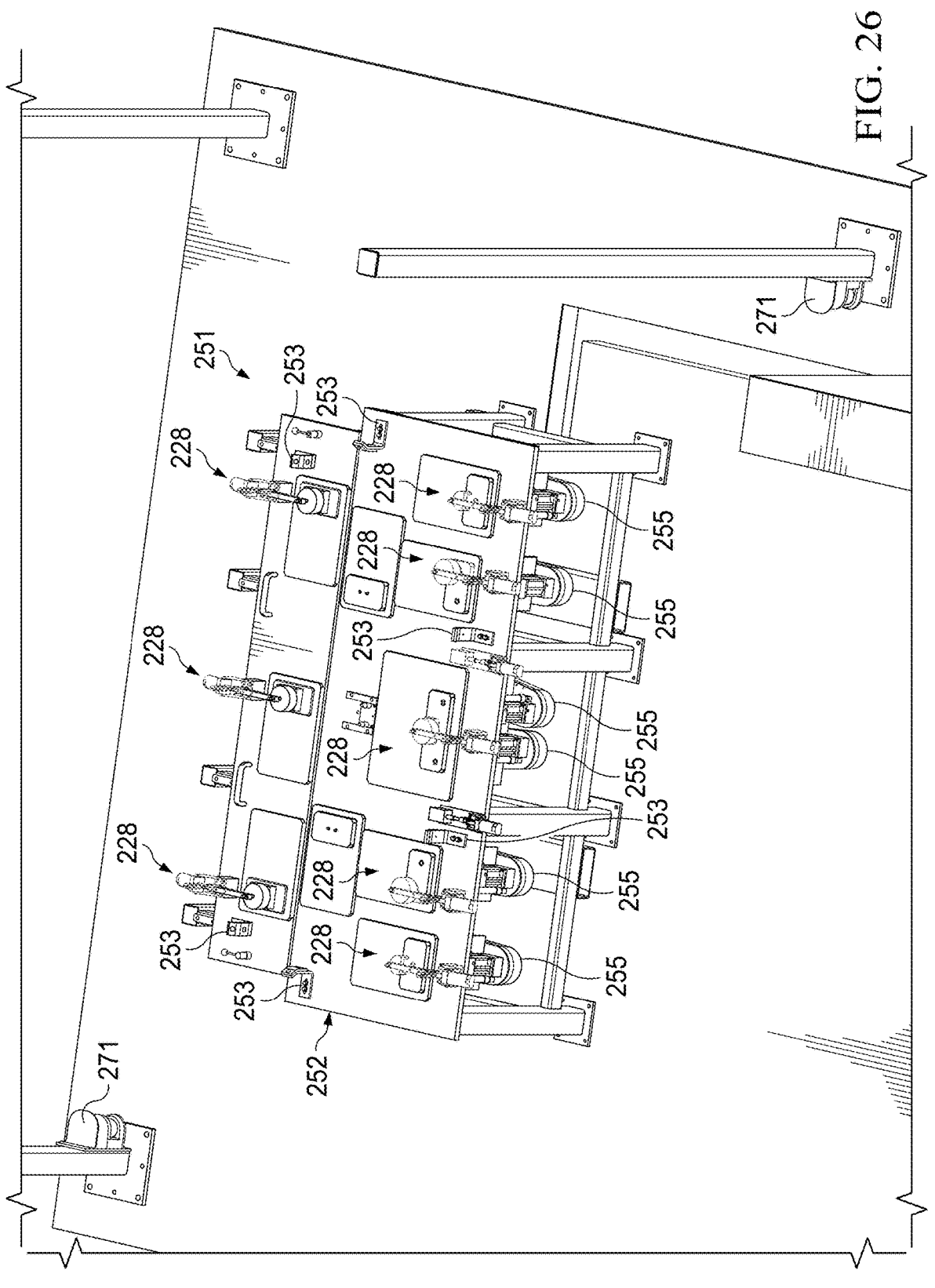
FIG. 26 is a front isometric view depicting a drilling machine for the support panel of the bunk assembly of FIG. 22.
Figure 27:
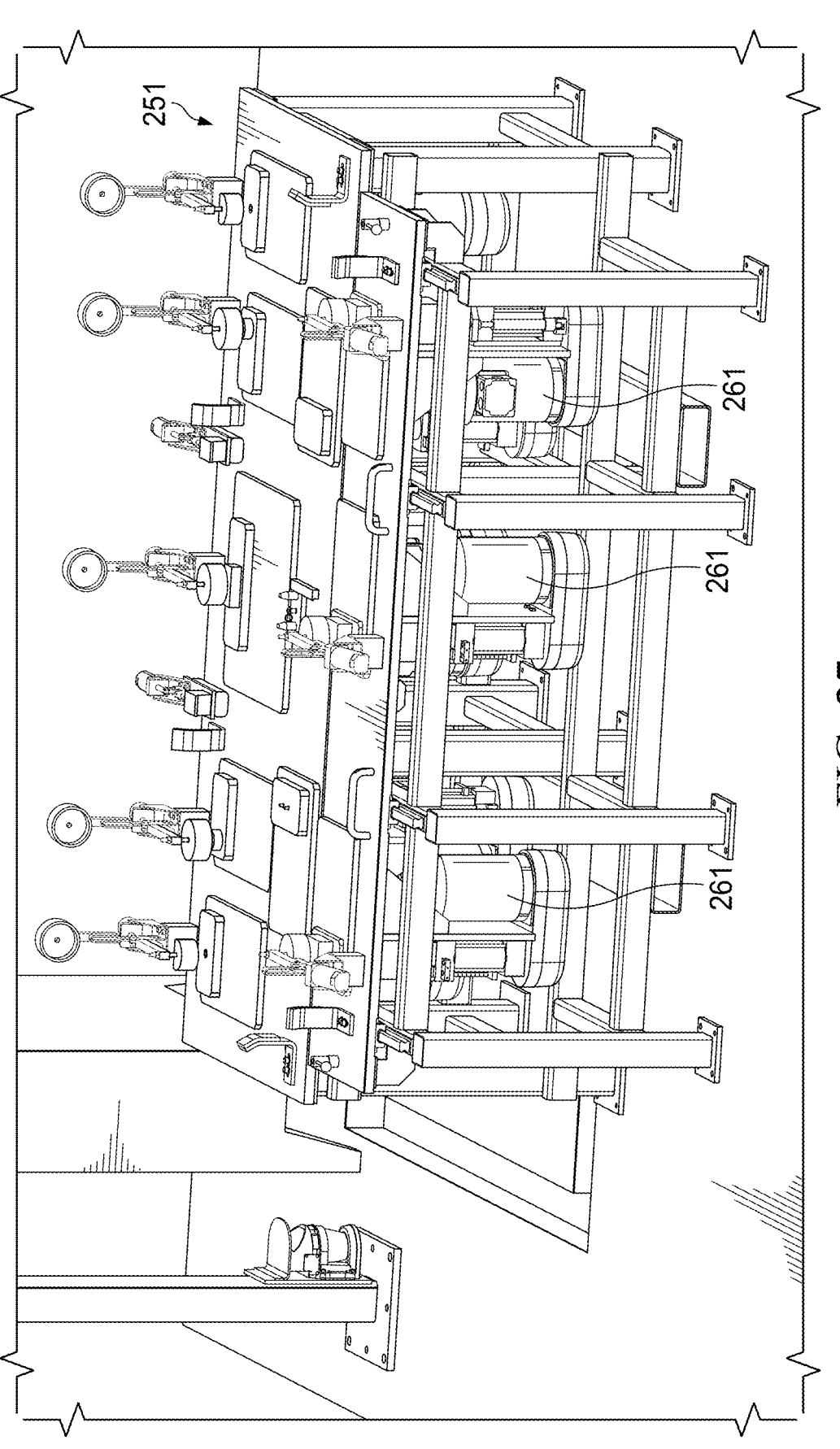
FIG. 27 is an isometric view depicting the drilling machine of FIG. 26.
Figure 28:
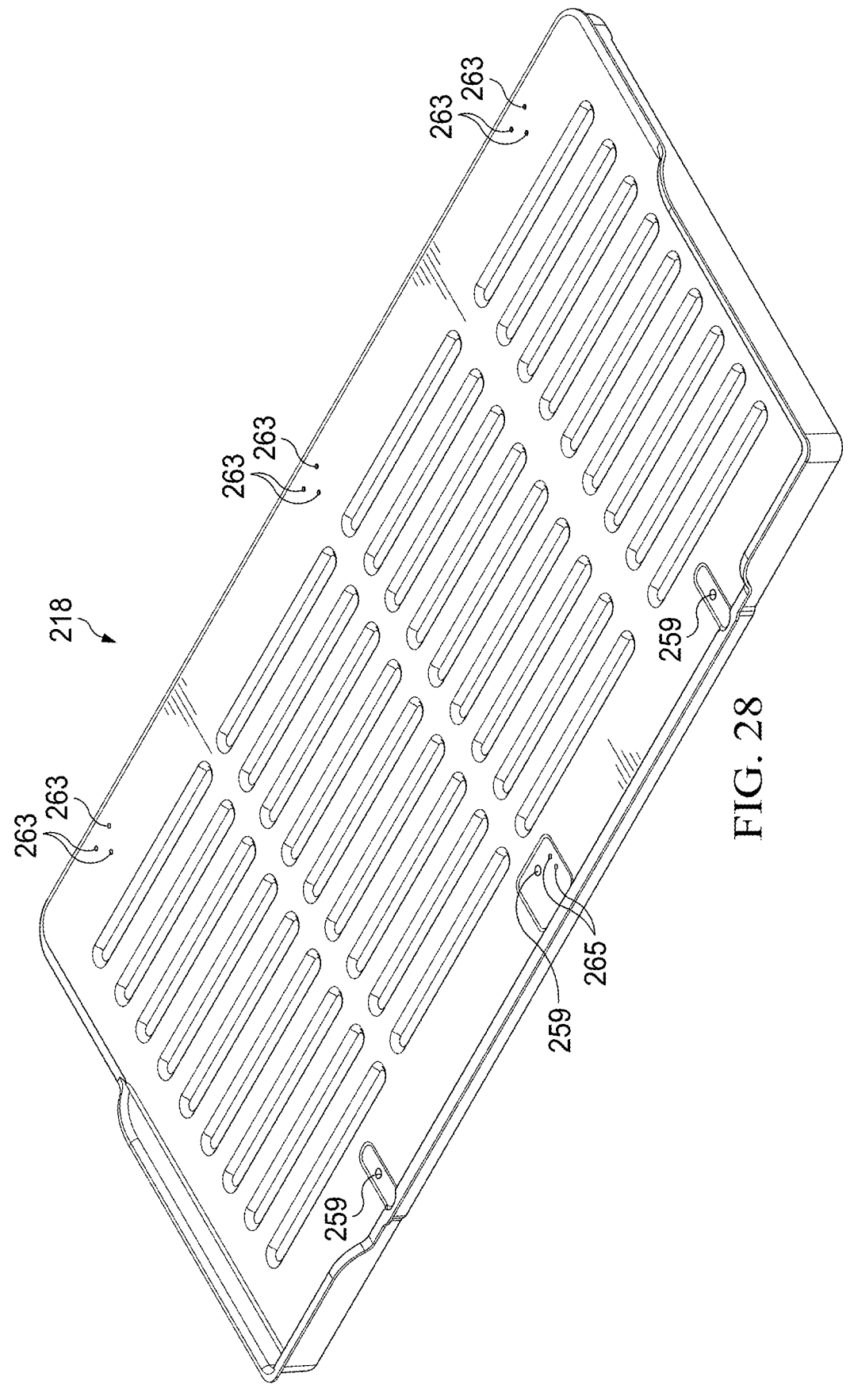
FIG. 28 is an upper isometric view of the support panel of the bunk assembly of FIG. 22 after being drilled by the drilling machine of FIGS. 26 and 27.
Figure 29:
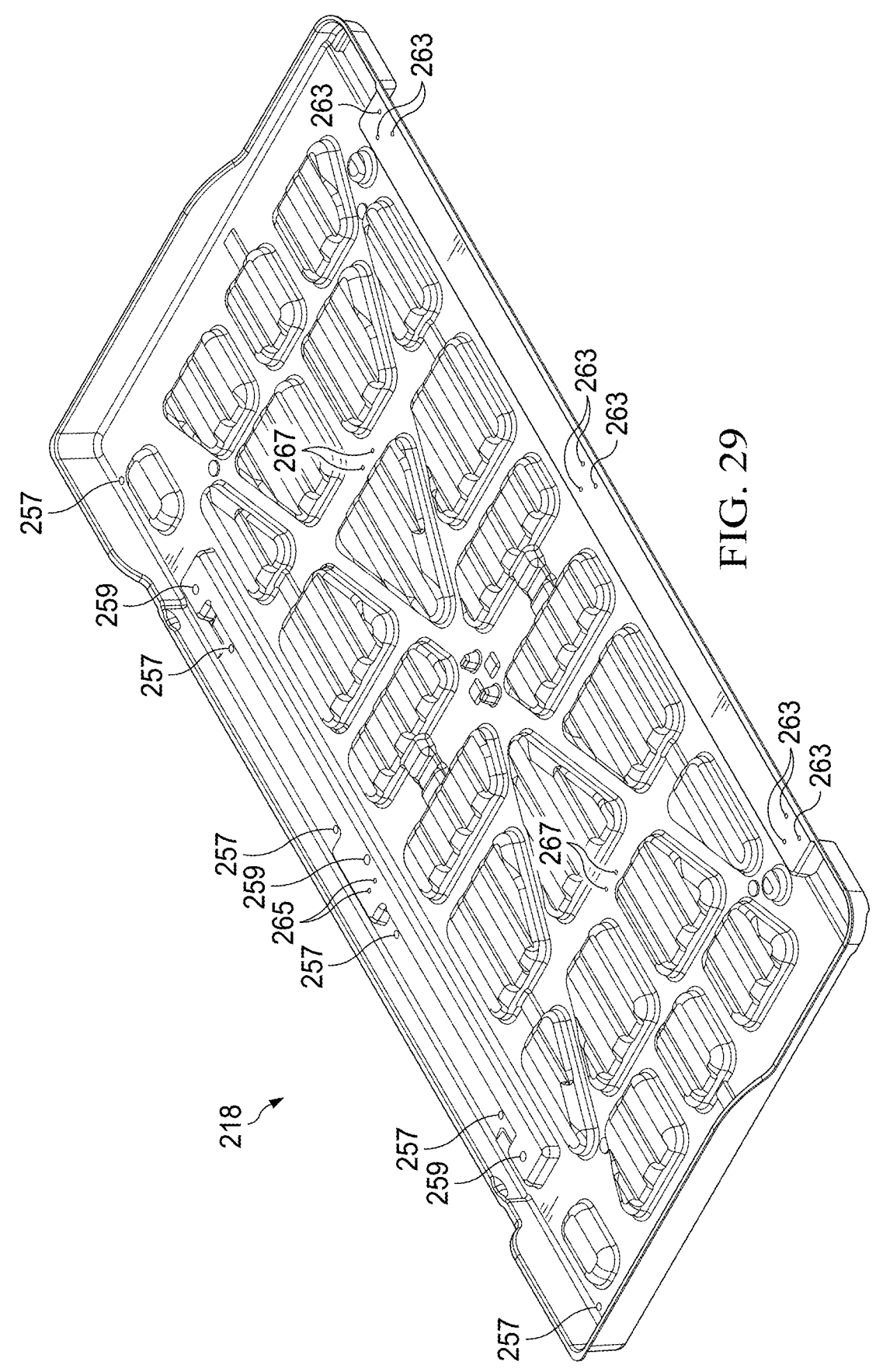
FIG. 29 is a lower isometric view of the support panel of FIG. 28.

The support panel 218 can then be cooled and installed onto a drilling machine 251, as illustrated in FIGS. 26 and 27, that drill various mount holes in the support panel 218 via an automated process, as will be described in further detail below. The drilling machine 251 can include a support bed 252 that can support the support panel 218 during the trimming and drilling operation. The support bed 252 can include a plurality of locating tabs 253 that interface with the support panel 218 in such a way to ensure that the support panel 218 is only able to be installed on the table in one direction to prevent improper drilling. The drilling machine 251 can also include a plurality of clamping mechanisms 228 that facilitate selective clamping of the support panel 218 onto the support bed 252. In one embodiment, the clamping mechanisms 228 can be manually operated but automated clamping mechanisms are also contemplated. For purposes of illustration, the support panel 218 is shown in FIGS. 28 and 29 apart from the drilling machine 251 for ease of reference.

As illustrated in FIG. 26, the drilling machine 251 can include six front drills 255 that are vertically slidable relative to the support bed 252. Each of the front drills 255 can facilitate drilling of rivet mount holes 257 in the lower shell 222 (see FIG. 30) and/or buckle mount holes 259 in the support panel 218 (see FIGS. 29 and 30). As illustrated in FIG. 27, the drilling machine 251 can also include three rear drills 261 that are disposed on an opposite side of the support bed 252 as the front drills 255 and are vertically slidable relative to the support bed 252. Each of the rear drills 261 can facilitate drilling of three hinge mount holes 263 through the support panel 218 (see FIGS. 29 and 30). The drilling machine 251 can also include three intermediate drills (not shown) that are disposed between the front drills 255 and the rear drills 261 and are vertically slidable relative to the support bed 252. One of the intermediate drills can facilitate drilling of striker loop mount holes 265 in the support panel (see FIGS. 28 and 29) and the other intermediate drills can facilitate drilling of bracket mount holes 267 in the lower shell 222 (see FIG. 29).

Referring again to FIG. 26, a plurality of monitoring devices 271 (e.g., cameras) can be provided around the drilling machine 251 and can be configured to monitor for a hazardous condition at the drilling machine 251, such as, for example, an operator that is dangerously close to the drilling machine 251. If the monitoring devices 271 detect hazardous activity, the operation of the drilling machine 251 can be terminated until the hazardous condition is cleared (e.g., the operator moves to a safe distance from the drilling machine 251).

Once the drilling and trimming process is complete, the support panel 218 can be fitted with hardware using the mount holes drilled by the drilling machine 251. In particular, rivets (not shown) can be installed in the rivet mount holes 257 and the buckles 230 can be coupled to the support panel 218 at the buckle mount holes 259. The hinges 226 can be coupled to the support panel 218 at the hinge mount holes 263. The ball stud brackets 231 can be coupled to the support panel 218 at the bracket mount holes 267. The striker loop 233 can be coupled to the support panel 218 at the striker loop mount holes 265.

Figure 30:
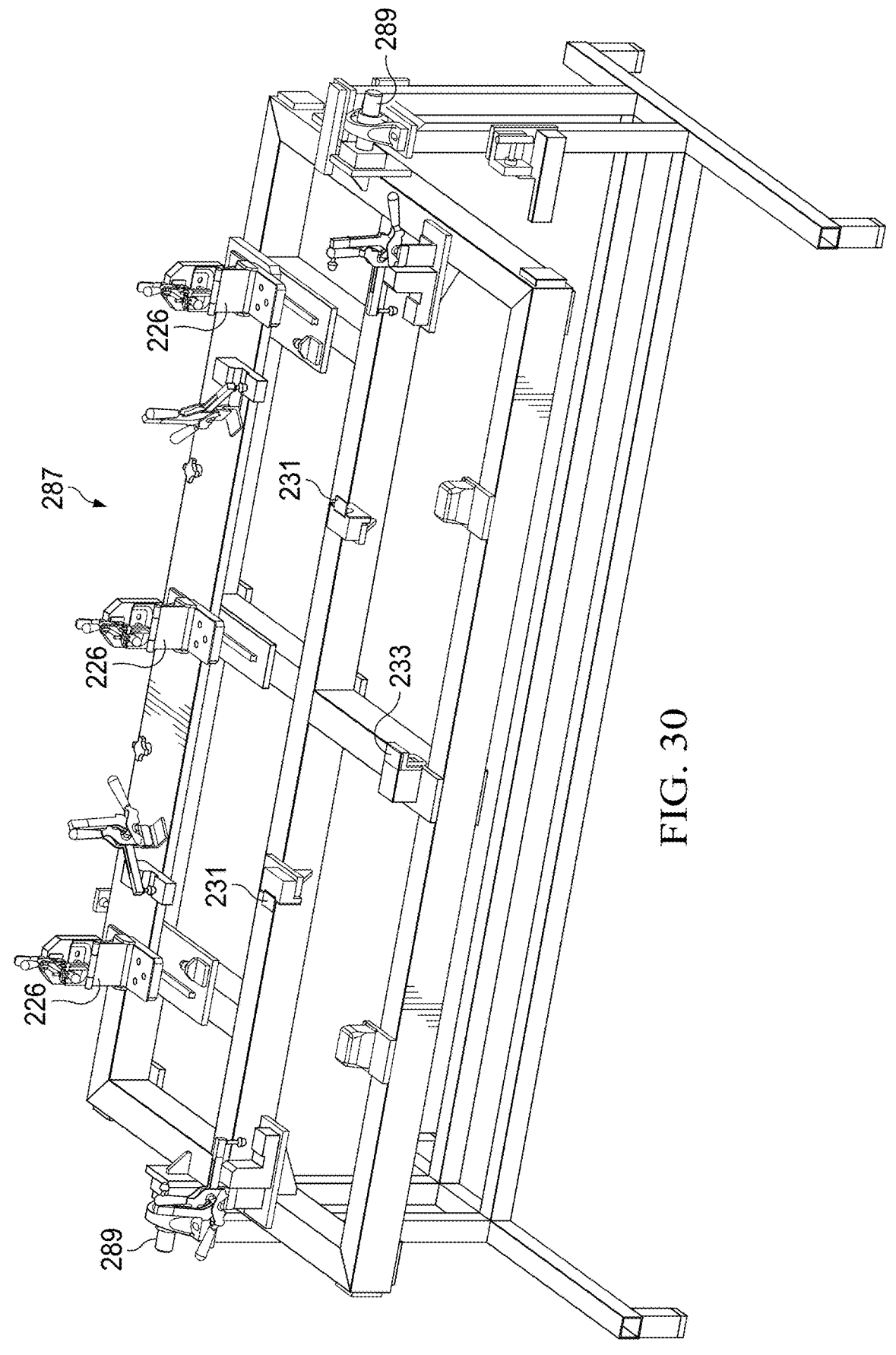
FIG. 30 is an isometric view of an assembly table for the bunk assembly of FIG. 22.

Referring now to FIG. 30, in one embodiment, an assembly table 287 can be provided that can support the support panel 218 during assembly of the components thereto. The assembly table 287 can be preloaded with the hardware (i.e., the hinges 226, the ball stud brackets 231, and the striker loop 233) to allow the hardware to be located precisely onto the support panel 218 for ease of assembly. The assembly table 287 can be selectively pivoted about pins 289 to allow for ease of access to the components and fastening locations (e.g., mount holes) during assembly.

The foregoing description of embodiments and examples of the disclosure has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate the principles of the disclosure and various embodiments as are suited to the particular use contemplated. The scope of the disclosure is, of course, not limited to the examples or embodiments set forth herein, but can be employed in any number of applications and equivalent devices by those of ordinary skill in the art. Rather it is hereby intended the scope of the invention be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A method for manufacturing a bunk assembly for a vehicle, the method comprising:
   forming an upper shell;
   forming a lower shell;
   forming a support panel from the upper shell and the lower shell;
   forming a fill hole and a vent hole in the support panel, the vent hole having a first diameter;
   filling the support panel with fill material through the fill hole such that air contained within the support panel is vented through the vent hole;
   enlarging the vent hole to a second diameter to form a mount hole, the second diameter being greater than the first diameter; and
   mounting hardware to the support panel at the mount hole.

2. The method of claim 1 wherein:
   forming the upper shell comprises thermoforming the upper shell; and
   forming the lower shell comprises thermoforming the lower shell.

3. The method of claim 1 wherein forming the fill hole and the vent hole comprises:
   locating a jig on the lower shell, the jig comprising a first guide hole and a second guide hole;
   drilling the fill hole through the first guide hole; and
   drilling the vent hole through the second guide hole.

4. The method of claim 1 wherein enlarging the vent hole comprises:
   installing the support panel onto a drilling machine that comprises an automated drill; and
   operating the automated drill to enlarge the vent hole to form the mount hole.

5. The method of claim 1 further comprising:
   installing the support panel on an assembly table comprising a pair of latch pins;
   aligning latches to a front wall of the support panel using the pair of latch pins; and
   mounting the latches to the front wall of the support panel.

6. The method of claim 1 wherein forming the support panel comprises adhering an upper flange on the upper shell and a lower flange on the lower shell together.

7. The method of claim 6 wherein adhering the upper flange and the lower flange together comprises:

applying adhesive between the upper flange and the lower flange; and compressing the upper flange and the lower flange together.

8. The method of claim 1 wherein filling the support panel with fill material comprises:

providing a foam cure fixture comprising a bed and a lid, the lid being pivotable between an opened position and a closed position;

installing the support panel onto the bed with the lid in the opened position;

pivoting the lid to the closed position such that a fill port on the lid is aligned with the fill hole of the lower shell;

locking the lid; and filling the support panel with expanding foam through the fill port and the fill hole.

9. The method of claim 8 wherein filling the support panel with fill material through the fill port and the fill hole further comprises:

inserting a tip portion of a foam dispensing hose; and dispensing the foam through the foam dispensing hose and from the tip portion into the support panel.

10. The method of claim 1 further comprising trimming an upper flange of the support panel.

11. The method of claim 10 wherein trimming the upper flange of the support panel comprises trimming the upper flange with a robotic trim arm.

12. A method for manufacturing a bunk assembly for a vehicle, the method comprising:

thermoforming an upper shell having an upper flange;

thermoforming a lower shell having a lower flange;

applying adhesive between the upper flange and the lower flange;

pressing the upper flange and the lower flange together to form a support panel;

trimming a main flange of the support panel;

forming a fill hole and a vent hole in the lower shell, the vent hole having a first diameter;

providing a foam cure fixture comprising a bed and a lid, the lid being pivotable between an opened position and a closed position;

installing the support panel onto the bed with the lid in the opened position;

pivoting the lid to the closed position such that a fill port on the lid is aligned with the fill hole of the lower shell;

locking the lid;

filling the support panel with fill material through the fill port and the fill hole and such that air contained within the support panel is vented through the vent hole;

enlarging the vent hole to a second diameter to form a mount hole, the second diameter being greater than the first diameter; and mounting hardware to the support panel at the mount hole.

13. The method of claim 12 wherein filling the support panel with fill material through the fill port and the fill hole comprises:

inserting a tip portion of a foam dispensing hose; and dispensing expanding foam through the foam dispensing hose and from the tip portion into the support panel.

14. The method of claim 12 wherein trimming the upper flange of the support panel comprises trimming the upper flange with a robotic trim arm.

15. The method of claim 12 further comprising:

installing the support panel on an assembly table comprising a pair of latch pins;

aligning latches to a front wall of the support panel using the pair of latch pins; and mounting the latches to the front wall of the support panel.

16. The method of claim 12 wherein forming the fill hole and the vent hole comprises:

locating a jig on the lower shell, the jig comprising a first guide hole and a second guide hole;

drilling the fill hole through the first guide hole; and drilling the vent hole through the second guide hole.

17. The method of claim 16 wherein drilling the vent hole comprises:

installing the support panel onto a drilling machine that comprises an automated drill; and operating the automated drill to enlarge the vent hole to form the mount hole.

18. A method for manufacturing a bunk assembly for a vehicle, the method comprising:

thermoforming an upper shell having an upper flange;

thermoforming a lower shell having a lower flange;

applying adhesive between the upper flange and the lower flange;

pressing the upper flange and the lower flange together to form a support panel;

locating a jig on the lower shell, the jig comprising a first guide hole and a second guide hole;

drilling a fill hole through the first guide hole;

drilling a vent hole through the second guide hole, the vent hole having a first diameter;

providing a foam cure fixture comprising a bed and a lid, the lid being pivotable between an opened position and a closed position;

installing the support panel onto the bed with the lid in the opened position;

pivoting the lid to the closed position such that a fill port on the lid is aligned with the fill hole of the lower shell;

locking the lid;

filling the support panel with fill material through the fill port and the fill hole such that air contained within the support panel is vented through the vent hole;

installing the support panel onto a drilling machine that comprises an automated drill;

operating the automated drill to redrill the vent hole to a second diameter to form a mount hole, the second diameter being greater than the first diameter; and mounting hardware to the support panel at the mount hole.

19. The method of claim 18 wherein filling the support panel with fill material through the fill port and the fill hole comprises:

inserting a tip portion of a foam dispensing hose; and dispensing expanding foam through the foam dispensing hose and from the tip portion into the support panel.

20. The method of claim 19 further comprising:

installing the support panel on an assembly table comprising a pair of latch pins;

aligning latches to a front wall of the support panel using the pair of latch pins; and mounting the latches to the front wall of the support panel.

* * * * *